United States Patent [19]

Takai et al.

[11] Patent Number: 5,801,864
[45] Date of Patent: *Sep. 1, 1998

[54] OPTICAL FREQUENCY DIVISION MULTIPLEXING NETWORK

[75] Inventors: Atsushi Takai; Ryoji Takeyari, both of Kokubunji; Akihiko Takase, Tokyo, all of Japan

[73] Assignee: Hitachi, Ltd., Tokyo, Japan

[*] Notice: The term of this patent shall not extend beyond the expiration date of Pat. No. 5,321,540.

[21] Appl. No.: 608,725

[22] Filed: Feb. 29, 1996

Related U.S. Application Data

[63] Continuation of Ser. No. 233,974, Apr. 28, 1994, Pat. No. 5,510,921, which is a continuation of Ser. No. 800,255, Nov. 29, 1991, Pat. No. 5,321,540.

[30] Foreign Application Priority Data

Nov. 30, 1990 [JP] Japan ................................ 2-337118

[51] Int. Cl.$^6$ .................................................. H04J 14/02
[52] U.S. Cl. .......................... 359/125; 356/167; 356/120
[58] Field of Search ........................ 359/115, 117, 359/118, 124, 125, 120, 121, 123, 173

[56] References Cited

U.S. PATENT DOCUMENTS

| | | |
|---|---|---|
| 4,642,804 | 2/1987 | Personick . |
| 4,658,394 | 4/1987 | Cheng et al. . |
| 4,704,715 | 11/1987 | Shibagaki et al. . |
| 4,705,350 | 11/1987 | Cheng . |
| 4,845,703 | 7/1989 | Suzuki . |
| 4,989,199 | 1/1991 | Rzeszewski ................ 359/123 |
| 5,005,166 | 4/1991 | Suzuki et al. . |
| 5,077,727 | 12/1991 | Suzuki . |
| 5,086,349 | 2/1992 | Okayama et al. . |
| 5,194,977 | 3/1993 | Nishio . |
| 5,321,540 | 6/1994 | Takai et al. ................ 359/124 |
| 5,510,921 | 4/1996 | Takai et al. ................ 359/124 |

FOREIGN PATENT DOCUMENTS

| | | |
|---|---|---|
| 0386482 | 2/1990 | European Pat. Off. . |
| A8204170 | 11/1982 | WIPO . |

OTHER PUBLICATIONS

M. Fujiware et al., "Photonic Switching System Using Coherent Optical Transmission Technologies", Proceedings Coherent Optical Communications and Photonic Switching 1, Tierenia (IT), pp. 394–364, Sep. 1989.
B. Strebel et al., "Switching in Coherent Multicarrier Systems", Proceedings IEEE Global Telecommunications 1 Conference 27, Dallas (US), pp. 32–36, Nov. 1989.
S. Wagner, Technology and System Issues for a WDM-Based Fiber Loop Architecture, vol. 7, No. 11, IEEE Journal of Lightwave Technology, pp. 1759–1768, Nov. 1989.
M. Vecchi, "Component Technologies for Multiwavelength Broadband Packet Switching Systems", Proceedings of IOOC '90, pp. 94–95.
Electronics Letters, vol. 24, No. 17, pp. 1106–1107, Aug. 1989.

*Primary Examiner*—Rafael Bacares
*Attorney, Agent, or Firm*—Antonelli, Terry, Stout & Kraus, LLP

[57] ABSTRACT

An optical frequency division multiplexing network includes first optical communication paths connected to terminals, respectively, a second optical communication path connected to the outside and a node composed of a selection unit for selecting signals having optical frequencies to be sent to the plurality of terminals, respectively, from signals transmitted through the second optical communication path in optical frequency division multiplexing, a conversion unit for converting the selected signals into signals having a single optical frequency and an output unit for producing the converted signals to the terminals through the first optical communication paths, respectively.

21 Claims, 16 Drawing Sheets

F I G. 8A
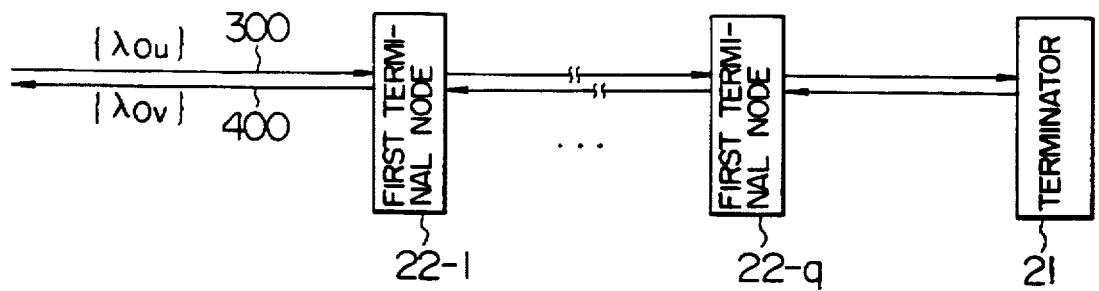
F I G. 8B
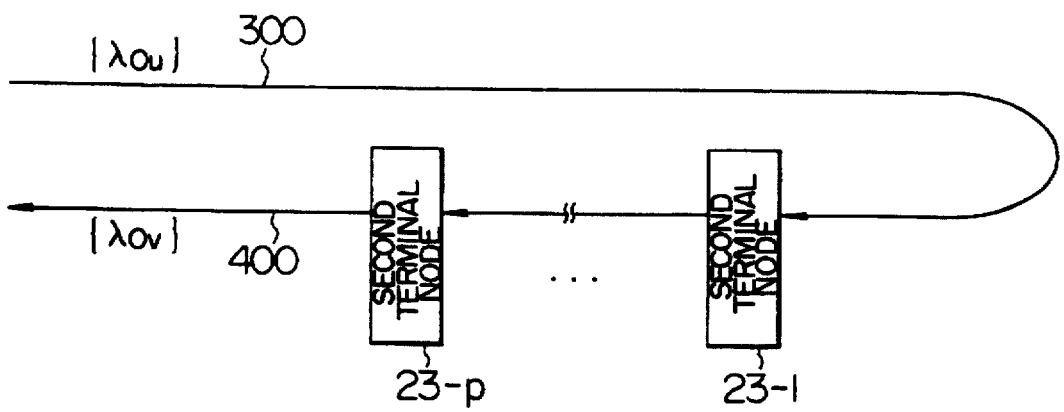
F I G. 9
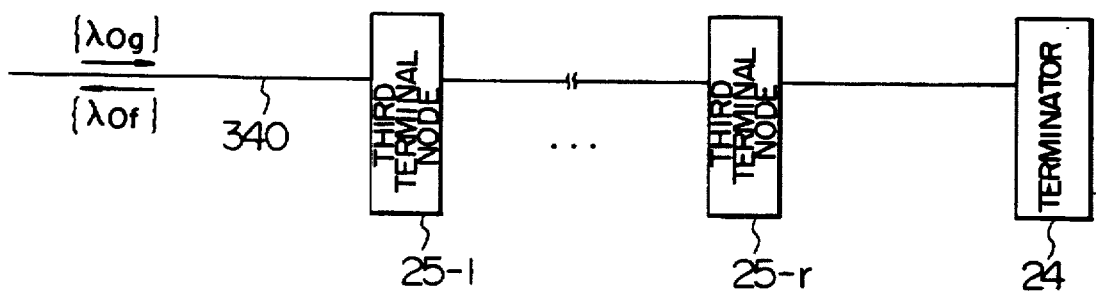

F I G. 11A
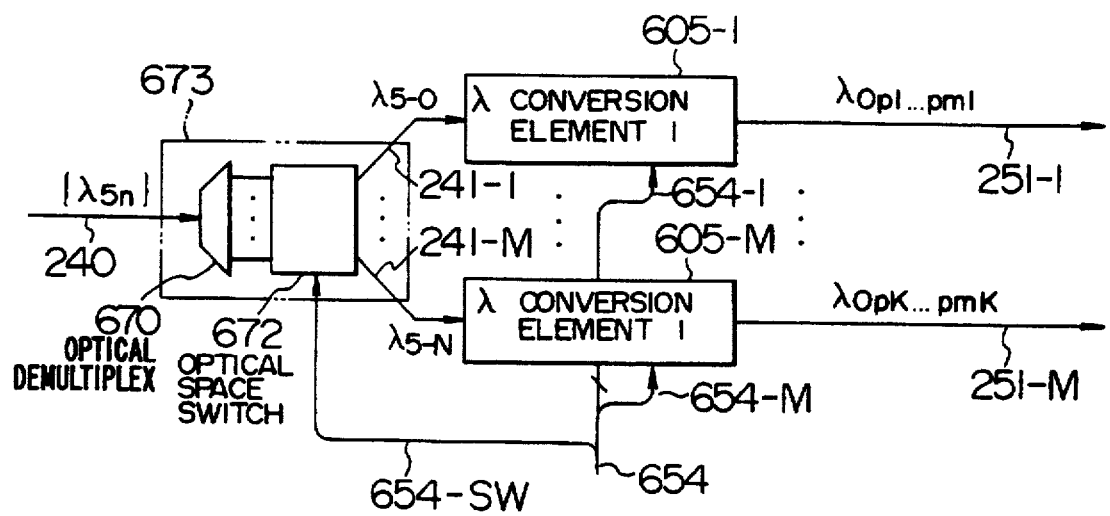
F I G. 11B
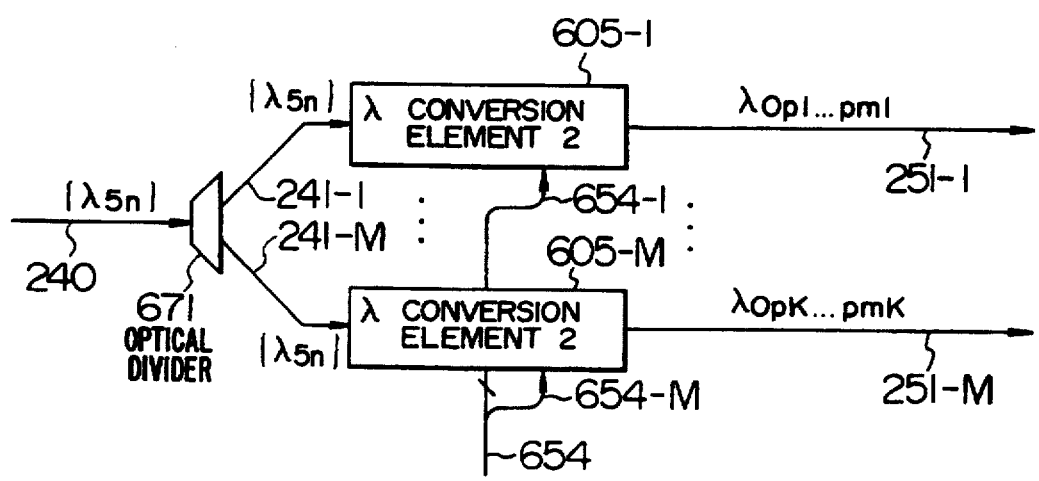

OPTICAL FREQUENCY DIVISION MULTIPLEXING NETWORK

This application is a 37 CFR §1.60 continuation of prior application Ser. No. 08/233,974, filed Apr. 28, 1994 (allowed) now U.S. Pat. No. 5,510,921, which was a continuation of application Ser. No. 07/800,255, filed Nov. 29, 1991 (patented) now U.S. Pat. No. 5,321,540.

BACKGROUND OF THE INVENTION

The present invention relates to an information transmission system employing optical communication, and more particularly to a network with high reliability and flexibility using optical frequency selection and optical frequency conversion functions.

Recently, with the advance of coherent communication techniques, there has been proposed a network utilizing optical frequency division multiplexing (or optical wavelength division multiplexing) transmission.

Typical examples of the optical frequency or wavelength division multiplexing network are found in paper (1) "IEEE Journal of Lightwave Technology, Vol. 7, No. 11, pp. 1759–1768, 1989" and paper (2) "Proceedings of IOOC, '90, pp. 84–95, 1990". Networks described in other papers are similar to those described in the above two papers.

A network configuration described in the paper (1) is shown in FIG. 2 of the paper and part thereof corresponding to the present invention is shown in FIG. 2 of the accompanying drawings. FIG. 2 shows a line distribution and collection system of the network shown in the paper (1). The system of FIG. 2 includes a remote node 10 having a wavelength demultiplexer 500 and a wavelength multiplexer 501 connected through optical fibers 100 and 200, respectively, to a central office and subscriber terminals 20-1~N connected through optical fibers 300-1~N to 400-1~N to the remote node. Signals having wavelength $\lambda_{11}$ to $\lambda_{1n}$ transmitted from the central office in wavelength division multiplexing fashion are demultiplexed into signals having the respective optical frequencies by the wavelength demultiplexer to be transmitted to the subscriber terminals 20-1~N. On the contrary, signals having wavelength $\lambda_{21}$ to $\lambda_{2n}$ transmitted from the subscriber terminals 20-1~N are wavelength-multiplexed by the wavelength multiplexer to be transmitted to the central office.

In the above-mentioned system, the subscriber terminals 20-1~N must transmit and receive signals having different wavelengths, respectively. In the paper (1), as shown in FIG. 4 thereof, receivers are common to the subscriber terminals, while transmitters employ lasers having different wavelengths for each subscriber terminal. Accordingly, a laser having stable wavelength must be provided in each subscriber terminal and hence there is a problem in reliability and flexibility. Further, movement of the subscriber terminal is not easy.

In the paper (1), transmission employs the conventional intensity modulation optical communication and accordingly it is difficult that the multiplex degree of optical signal exceeds 100. Even in this system, a coherent receiver capable of effecting multiplexing with the multiplex degree of 1000 or more can be used. In this case, receivers capable of receiving signals having wavelengths $\lambda_{11}$ to $\lambda_{1n}$ transmitted from the central office assigned to the subscriber terminals 20-1~N with wavelength division multiplexing are required. Accordingly, the receivers are expensive as compared with the present invention described later.

Further, coherent receivers having variable transmission wavelength and common to the subscriber terminals 20-1~N can be employed. In this case, however, signals having wavelength $\lambda_{21}$ to $\lambda_{2n}$ transmitted from the subscriber terminals are also multiplexed and accordingly the wavelength must be stable. It is difficult to remotely control the wavelength and hence the reliability of the network is also degraded.

Furthermore, when it is to be attempted that the optical fibers 300-1~N and 400-1~N are combined to effect bi-directional transmission by means of a single optical fiber per subscriber terminal, "it is basically required that all of wavelengths $\lambda_{11}$ to $\lambda_{1n}$ and $\lambda_{21}$ to $\lambda_{2n}$ are different" and utilization efficiency of frequency is deteriorated.

A network configuration described in the paper (2) is shown in FIG. 1 of the paper and is shown in FIG. 3 of the accompanying drawings in corresponding manner to the present invention. The system includes a remote node (not shown in the paper (2)) having a power divider 502 and a transport star coupler or wavelength multiplexer 501 connected to a central office (not shown in the paper (2)) through optical fibers 100 and 200 and fixed wavelength receivers and tunable transmitters or subscriber terminals 20-1~N connected to the remote node through optical fibers 300-1~N and 400-1~N. All optical signals having wavelengths $\lambda_{11}$ to $\lambda_{1n}$ transmitted from the central office with wavelength division multiplexing are transmitted to the subscriber terminals 20-1~N by means of the power divider and the subscriber terminals 20-1~N receive only necessary signals by receivers for receiving only particular wavelength. On the contrary, signal having wavelength $\lambda_{21}$ to $\lambda_{2n}$ transmitted from the subscriber terminals are wavelength-multiplexed by the wavelength multiplexer to be transmitted to the central office.

This system is featured in that an inexpensive power divider is used instead of the wavelength de-multiplexer of the paper (1) and wavelength selection reception which is a maximum advantage of coherent transmission can be utilized.

The maximum drawback of this system is that all of the subscriber terminals 20-1~N can receive all signals. Thus, there is a problem in privacy characteristic.

Accordingly, in the system of the paper (2), receivers having fixed receive frequency are disposed in each of the subscriber terminals 20-1~N. However, there remains the problem in the privacy characteristic for malicious operation.

Further, when coherent transmitter and receiver are used, the transmitter and receiver of the system have also the same problem as in the transmitter and receiver of the paper (1).

The conventional network utilizing the wave-length division multiplexing has drawbacks as follows. Particularly, since the wavelength employed between the central office and the remote node and between the remote node and the subscriber terminals is the same, a failure occurring in one subscriber terminal influences all of the subscriber terminals connected to the remote node to which the subscriber terminal having the failure is connected. Further, since the transmitter and receiver of the subscriber terminal must deal with a multiplicity of frequencies and require the same reliability as that of the central office, it is very expensive. In addition, expansion of the network and rearrangement of the subscriber terminals are not made easily and the flexibility of the network is lacking.

SUMMARY OF THE INVENTION

It is an object of the present invention to provide a network having transmitters and receivers for terminals utilizing inexpensive common optical frequency division multiplexing and having good privacy characteristic, high reliability and flexibility.

In order to achieve the above object, the present invention has the following measures.

1. A node for distributing signals transmitted in optical frequency division multiplexing to terminals selects an optical frequency corresponding to the terminal from the transmitted signals and converts the selected optical frequency into an optical frequency determined in an interface common to the terminals to be transmitted to the terminals.

2. A node for collecting signals transmitted from the terminals and transmitting the signals in optical frequency division multiplexing fashion converts the signals transmitted with the optical frequency determined in the interface common to the terminals into optical frequencies to be transmitted in the optical frequency division multiplexing fashion.

FIG. 1 shows a basic logical configuration of the present invention. It comprises a remote node 10 connected through optical speech paths or optical channels 100 and 200 to an upper node and terminals 20-1~N connected to the remote node 10 through optical fibers 300-1~N and 400-1~N. The remote node 10 includes optical frequency selectors 600-1~N for selecting optical frequencies in accordance with control signals 650-1~N, optical frequency converters 601-1~N for converting optical frequency in accordance with the control signals 650-1~N, optical frequency converters 602-1~N for converting optical frequency in accordance with control signals 660-1~N, and a control unit 11 for producing the control signals 650-1~N and 660-1~N. The optical frequency selectors 600-1~N select signals having optical frequencies $\lambda_{11}$ to $\lambda_{1n}$ corresponding to the terminals from signals having optical frequencies $\lambda_{11}$ to $\lambda_{1n}$ transmitted from the upper node through the optical channel 100 in the optical frequency division multiplexing in accordance with the control signals 650-1~N produced by the control unit 11 and the selected signals are converted into signals having optical frequency $\lambda_{10}$ determined in an interface common to the terminal by the optical frequency converters 601-1~N in accordance with the control signals 650-1~N of the control unit 11 to transmit the converted signals to the terminals 20-1~N through the optical fibers 300-1~N. On the contrary, signals transmitted from the terminals 20-1~N through the optical fibers 300-1~N and having optical frequency $\lambda_{20}$ determined in the interface common to the terminals are converted by the optical frequency converters 602-1~N into signals having optical frequencies $\lambda_{21}$ to $\lambda_{2n}$ in accordance with the control signals 660-1~N of the control unit 11 and are optical frequency division multiplexed to be transmitted to the upper node.

FIG. 1 shows the logical configuration, while even if the optical frequency selection and the optical frequency conversion are replaced with each other, it can be configured by a functioning portion which performs the optical frequency selection and the optical frequency conversion simultaneously.

Further, the optical frequency of the signals between the terminals and the node is not limited to one kind, and a system in which the optical frequency is selected from predetermined frequencies can be configured.

Transmission between the terminals and the node can be made by the optical frequency division multiplexing transmission and further by the optical frequency division multiplexing bi-directional transmission. At this time, a plurality of optical frequencies between the terminals and the node common to the terminals are required.

According to the present invention, since the signal having the frequency corresponding to the terminal is selected by the optical frequency selector and only the signal is optical frequency division multiplexed to be transmitted to the terminal, the privacy is ensured.

Further, since the optical frequencies for communication between the upper node and the remote node and between the remote node and the terminals are assigned independently and are controlled by the control unit of the remote node, the reliability is high and the flexibility is increased. In addition, by assigning the optical frequencies between the upper nodes and the remote node dynamically, the high reliable and flexible network can be realized.

The transmit and receive optical frequency of the terminal is common to the terminals and fixed, and the frequency range is narrow. Even when a plurality of optical frequency are assigned, frequency spacing may be made wide and accordingly inexpensive and relaible terminals can be attained.

BRIEF DESCRIPTION OF THE DRAWINGS

FIGS. 8A, 8B and 9 schematically illustrate terminal networks.

FIGS. 11A and 11B schematically illustrate configurations of an optical frequency conversion circuit.

DESCRIPTION OF THE PREFERRED EMBODIMENTS

An embodiment to which the present invention is applied is now described with reference to FIGS. 4 to 20. The embodiment shows one configuration, while actually constituent elements can be omitted or combined depending on information content and the number of terminals.

Figure 4:
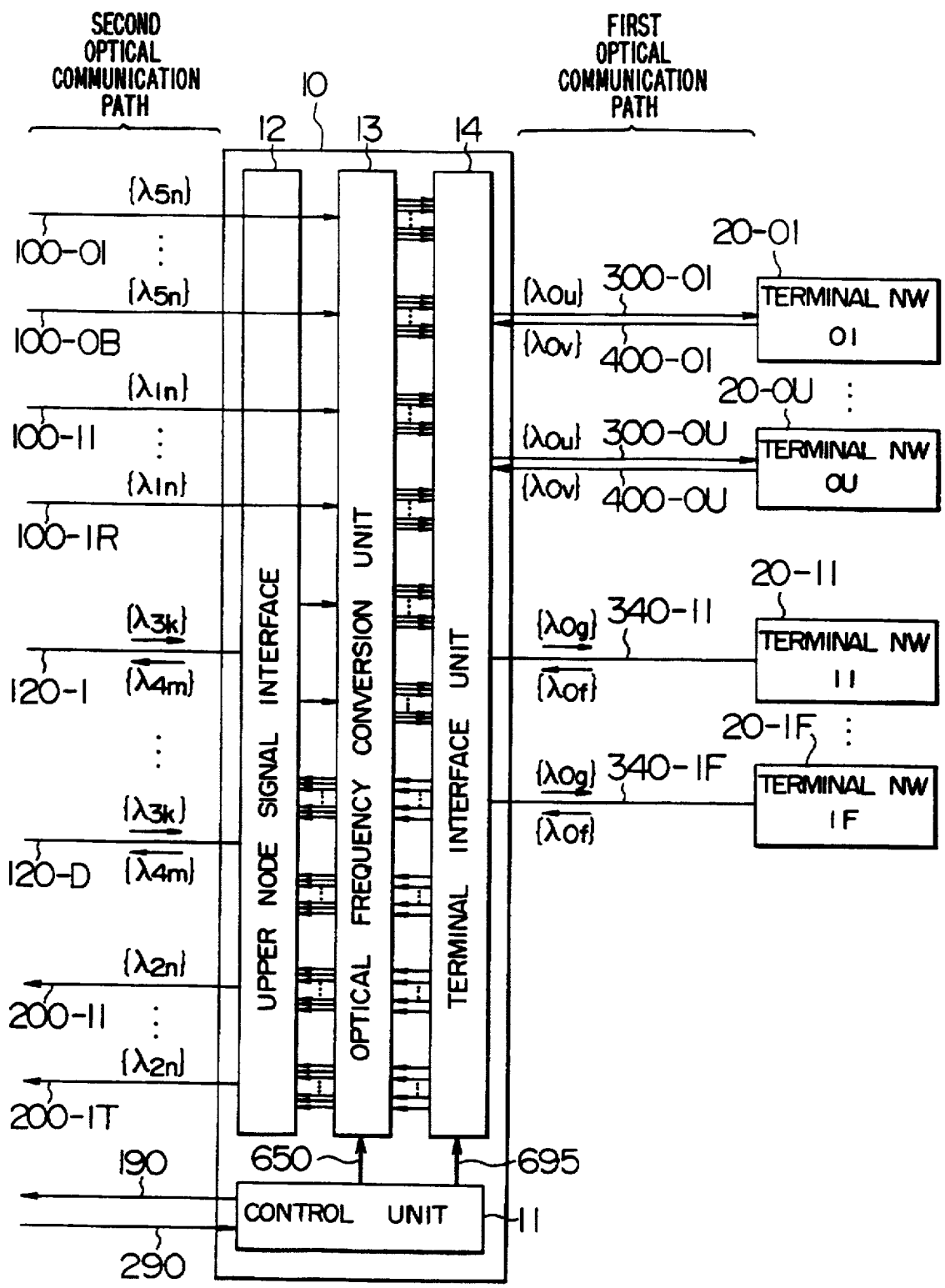
FIG. 4 schematically illustrates the whole configuration according to an embodiment of the present invention.

FIG. 4 schematically illustrates a configuration of a network of the embodiment. The network comprises a node 10 for distributing information to terminals, optical fibers 100-01~B, 100-11~R, 120-1~D and 200-11~T for connecting between the node and an upper node, control signal lines 190 and 290 for transmitting control information between the node 10 and the upper node, terminal networks 20-01~U and 20-11~F, and optical fibers 300-01~U, 400-01~U and 340-11~F for connecting between the node and the terminal networks. The node 10 includes an upper node signal interface unit 12, an optical frequency conversion unit 13, a terminal interface unit 14 and a control unit 11. Signals having frequencies $\lambda_{5n}$, $\lambda_{1n}$ and $\lambda_{3k}$ transmitted through the optical fibers 100-01~B, 100-11~R and 120-1~D from the upper node are optical frequency division demultiplexed or divided in the upper node signal interface unit 12 if necessary and are supplied to the optical frequency conversion unit 13. The signals are further optical frequency converted by the optical frequency conversion unit 13 selectively in accordance with a command signal 650 produced by the control unit 11 if necessary and are multiplexed to signals having frequencies $\lambda_{ou}$ and $\lambda_{og}$ corresponding to the terminal networks in accordance with a command signal 695 from the control unit 11 by the terminal interface unit 14 if necessary to be distributed to the terminal networks 20-01~U and 20-11~F through the optical fibers 300-01~U and 340-11~F. On the contrary, signals having frequencies $\lambda_{ov}$ and $\lambda_{of}$ transmitted from the terminal networks 20-01~U and 20-11~F through the optical fibers 400-01U and 340-11F are optical frequency division demultiplexed/ multiplexed or divided/optical frequency division multiplexed by the terminal interface unit 14 if necessary and are supplied to the optical frequency conversion unit 13. Further, the signals are optical frequency converted by the optical frequency conversion unit 13 selectively in accordance with the command signal 650 from the control unit 11 and are multiplexed by the upper node signal interface unit 12 if necessary to be transmitted as signals having frequencies $\lambda_{4m}$ and $\lambda_{2n}$ to the upper node through the optical fibers 200-11~T and 120-1~D. It is assumed that each one of the terminal networks 20-01~U and 20-11~F corresponds to each one of the subscribers as a rule and the privacy in the network of the embodiment is insured for the terminal networks.

Signals are transmitted in the optical frequency division multiplexing fashion from the upper node to the node 10 through the optical fibers 100-01~B and 100-11~R, from the node 10 to the upper node through the optical fibers 200-11~T, and bi-directionally between the upper node and the node 10 through the optical fibers 120-1~D. Assignment of the optical fibers and the optical frequencies to signals is made so that service and maintenance are optimum. In the embodiment, broadcasting signal such as a TV signal is transmitted through the optical fibers 100-01~B. Part of up and down signals of the terminals has the same optical frequency in two corresponding optical fibers 100-1i and 200-1i (i∈{1 ... R=T}) on condition that the number of the optical fibers 100-11~R is equal to the number of the optical fibers 200-11~T (R=T). Further, each one frequency of the up signal frequencies {$\lambda_{4m}$} and the down signal frequencies {$\lambda_{3k}$} in one optical fiber of the fibers 120-1~D is assigned to the remaining of the up and down signals of the terminals. Assignment of signals to the optical fiber and the optical frequency of the assigned fiber is determined by the upper node, the node 10 or both of them. In the embodiment, the upper node has the right of decision and the node 10 performs monitoring/detection of a failure or the like to transmit control information to the upper node through the control signal line 290 properly. The upper node assigns the fibers and the optical frequencies to the signals in accordance with line assignment request from terminal and to terminal, maintenance information, control signal of the node 10 and the like and transmits the signals to the node 10 through the control signal line 190. The assignment involves fixed and semi-fixed assignment (re-assignment is made only when a failure occurs) and dynamic assignment selected in accordance with a kind of terminal or the like. Further, there is a case where a signal transmitted to one terminal is transmitted to the node through a different fiber. The fibers and the optical frequencies are configured redundantly and the fibers and the optical frequencies are re-assigned upon occurrence of a failure.

The optical frequency of the signal between the upper node and the node 10 is determined by a kind of signal (analog signal or digital signal), a modulation method, a signal band and an optical circuit component such as an optical frequency conversion element, while it is set to high density. In the embodiment, 32 channels of digital signal having 622 Mb/s at its maximum are assigned to bands having optical wavelengths of 1.3 μm and 1.5 μm for the optical fibers 100-01~B at intervals of 10 GHz, 128 channels of digital signal having 155 Mb/s at its maximum are assigned to bands having optical wavelengths of 1.3 μm and 1.5 μm for the optical fibers 100-11~R and 200-11~T at intervals of 2.5 GHz, and 128 channels of digital signals having 155 Mb/s at its maximum are assigned to bands having optical wavelengths of 1.3 μm for the up signal and 1.55 μm for the down signal for the optical fibers 120-1~D at intervals of 2.5 GHz.

One optical frequency transmission or optical frequency division multiplexing transmission is made from the node to the terminal network through the optical fibers 300-01~U, from the terminal network to the node through the optical fibers 400-01~U and bi-directionally between the node and the terminal network through the optical fibers 340-11~F. The optical fibers 300-0i and 400-0i (i=1 ... U) are wired by two-wire fiber cable.

The optical frequency of the signal between the terminal networks and the node 10 is determined by a kind of signal (analog signal or digital signal), a modulation method, a signal band and an optical circuit component such as an optical frequency conversion element in the same manner as between the upper node and the node 10, while it is determined in consideration of conditions on the side of terminal such as a cost and a size. In the embodiment, 16 channels of digital signal having 622 Mb/s at its maximum are assigned to bands having optical wavelengths of 1.3 μm and 1.5 μm for the optical fibers 300-01~U and 400-01~U at intervals of 10 GHz, 3 channels are assigned at intervals of 160 GHz from the frequency separated from the above frequency by 160 GHz, 16 channels of digital signal having 622 Mb/s at its maximum are assigned to bands having optical wavelength of 1.3 μm for the up signal and 1.5 μm for the down signal for the optical fibers 340-11~F at intervals of 10 GHz, and 3 channels are assigned at intervals of 160 GHz from the frequency separated from the above frequency by 160 GHz. The former optical frequency having the interval of 10 GHz is assumed to be a broadcasting signal such as a TV signal. One channel of the latter three channels is for terminal and the remaining two channels are for expansion.

Figure 5:
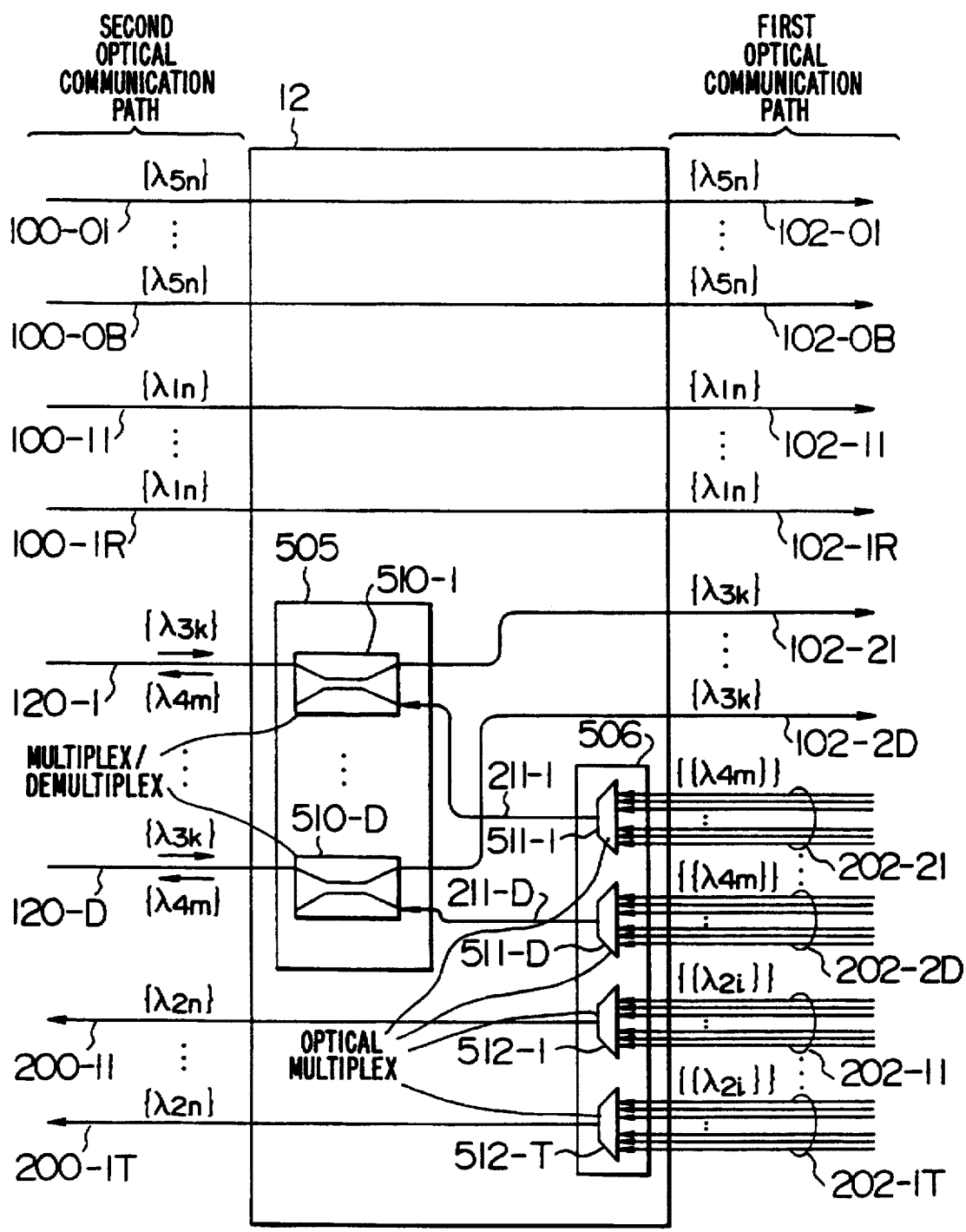
FIG. 5 schematically illustrates a configuration of an interface of an upper node.

FIG. 5 schematically illustrates a configuration of the upper node interface unit 12. The upper node interface unit 12 comprises a multiplexer 506 for the down signals having a frequency of $\lambda_{2n}$ including optical multiplexers 511-1~D for multiplexing the up signals having frequencies $\lambda_{4m}$ and $\lambda_{2i}$ transmitted through optical waveguides 202-21~2D from the optical frequency conversion unit 13 to send the multiplexed signals to a bi-directional multiplexing/demultiplexing unit 505 and optical multiplexers 512-1~T for multiplexing the up signals having frequencies $\lambda_{4m}$ and $\lambda_{2i}$ transmitted through optical waveguides 202-11~1T from the optical frequency conversion unit 13 to produce the multiplexed signals to optical waveguides 200-11~T and a bi-directional multiplexing/demultiplexing unit 505 including a bi-directional multiplexer/demultiplexers or a bi-directional multiplexer/dividers 510-1~D for multiplexing/demultiplexing or multiplexing/dividing the down signals having frequency of $\lambda_{3k}$ of bi-directional signals on the optical waveguides 120-1~D to be transmitted through the optical waveguides 102-21~2D to the optical frequency conversion unit 13 and the up signals having frequency $\lambda_{4m}$ transmitted from the optical frequency conversion unit 13 through the optical waveguides 202-21~2D. The bi-directional multiplexer/demultiplexers or bi-directional multiplexer/dividers 510-1~D can utilize the reverse movement of light to be realized by supplying input signals from one output of an optical demultiplexer or optical divider.

Figure 6:
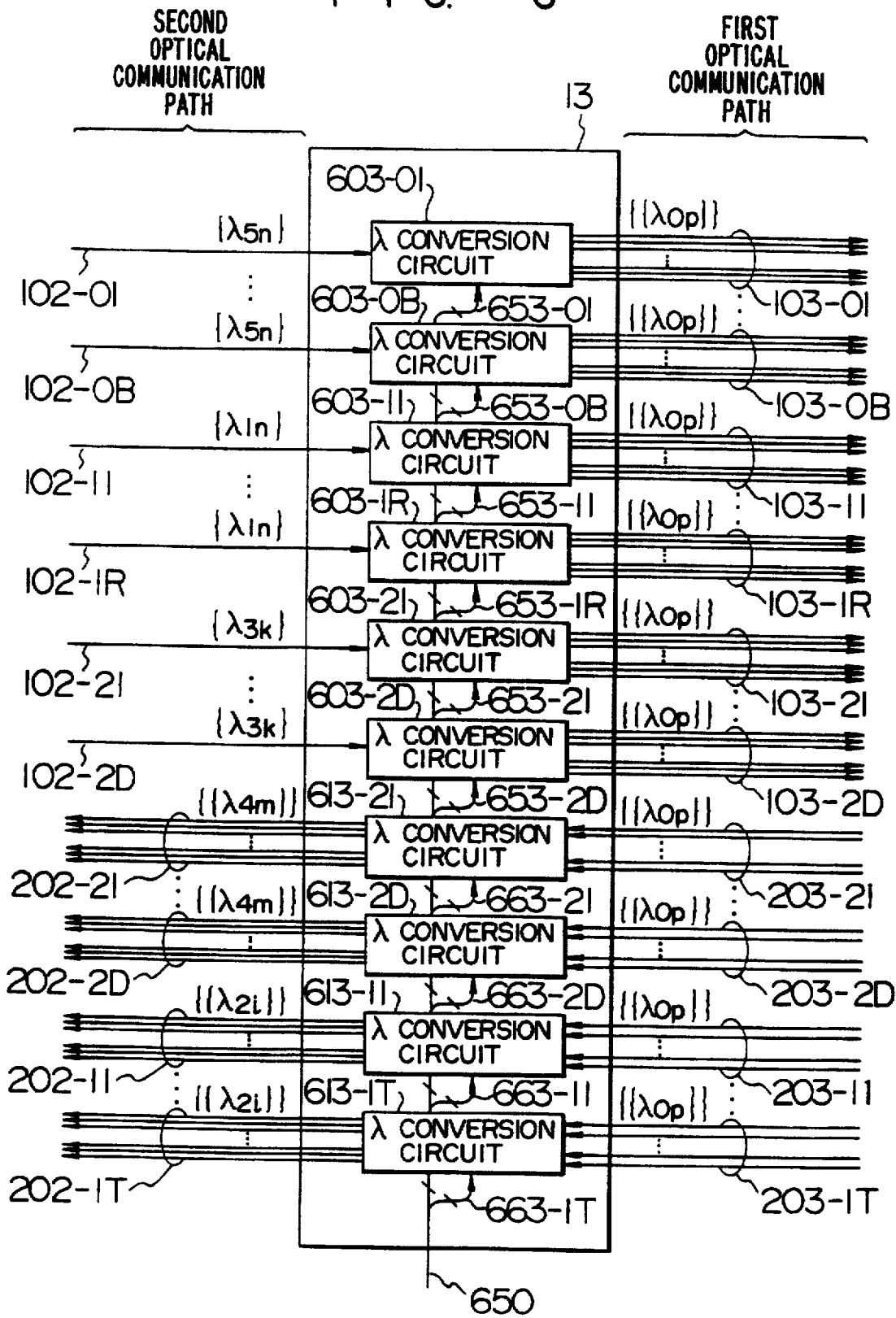
FIG. 6 schematically illustrates a configuration of an optical frequency converter.

FIG. 6 schematically illustrates a configuration of the optical frequency conversion unit 13. The optical frequency conversion unit 13 comprises optical frequency conversion circuits 603-01~0B, 603-11~1R and 603-21~2D for optical frequency converting down signals having frequencies $\lambda_{5n}$, $\lambda_{1n}$ and $\lambda_{3k}$ transmitted through the optical waveguides 102-01~0B, 102-11~1R and 102-21~2D in the optical frequency division multiplexing fashion in accordance with frequency conversion control signals 653-01~0B, 653-11~1R and 653-21~2D to send the converted signals onto optical waveguide bundles 103-01~0B, 103-11~1R and 103-21~2D, and optical frequency conversion circuit groups 613-11~1T and 613-21~2D for optical frequency converting up signals having frequency $\lambda_{op}$ transmitted through optical waveguide bundles 203-11~1T and 203-21~2D in the optical frequency division multiplexing fashion in accordance with frequency conversion control signal 663-11~1T and 663-21~2D produced from the control unit 11 to send the converted signals to optical waveguide bundles 202-11~1R and 202-21~2D as signals having frequencies $\lambda_{2i}$ and $\lambda_{4m}$.

Figure 10:
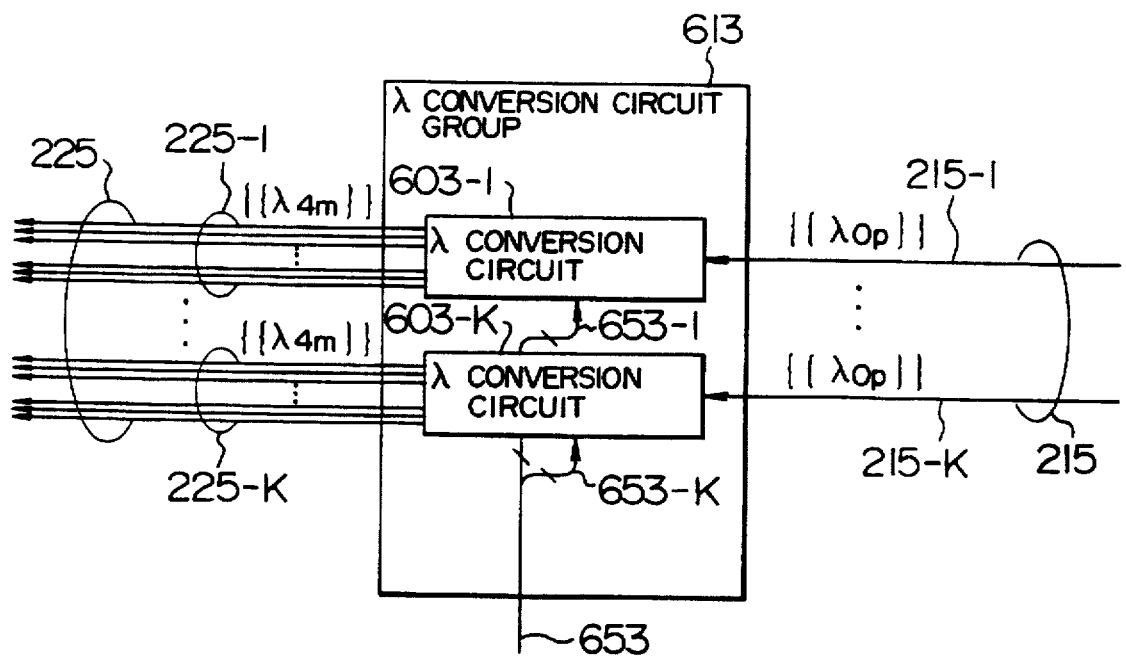
FIG. 10 schematically illustrates a configuration of an optical frequency conversion circuit group.

FIG. 10 schematically illustrates a configuration of the optical frequency conversion circuit group. The optical frequency conversion circuit group 613 comprises optical waveguides 215-1~K, optical waveguide bundles 230-1~K and optical frequency conversion circuits 603-1~K supplied with signals from the optical waveguides 215-1~K to effect optical frequency conversion in accordance with frequency conversion control signals 653-1~K (which are the same as the control signal 663) to send to the optical waveguide bundles 225-1~K.

FIGS. 11A and 11B schematically illustrate configurations of the optical frequency conversion circuit. The optical frequency conversion circuit is supplied with a signal from an optical waveguide 240 and optical frequency converts the signal in accordance with frequency conversion control signal 654 to be sent to optical waveguides 251-1~M (=optical waveguide bundle 250). The embodiment employs two kinds of circuits shown in FIGS. 11A and B. The optical frequency conversion circuit shown in FIG. 11A comprises an optical frequency selector 673 including an optical demultiplexer 670 and an optical space switch 672, first optical frequency conversion elements 605-1~M for frequency converting inputted optical signal, and optical waveguides 241-11~M for connecting between the optical frequency selector 673 and the optical frequency conversion elements 605-1~M. The optical frequency selector 673 optical frequency selects optical signal transmitted through the optical waveguide 240 and sends the selected signal to the optical waveguides 241-1~M by means fo the optical space switch 672 in accordance with one signal 654-SW of the control signal 654. The selected signal is optical frequency converted by the optical frequency conversion elements in accordance with the frequency conversion control signals 654-1~M. The optical space switch 672 is inserted to cause the optical waveguides 251 to correspond to the optical frequencies, while it can be treated by the terminal interface unit 14 depending on system configuration and in this case it is omitted. The optical frequency conversion circuit shown in FIG. 11B comprises an optical divider 671, optical frequency selection and conversion elements 605-1~M for frequency converting inputted optical signal and optical waveguides 241-1~M for connecting the optical divider 671 and the optical frequency selection and conversion elements. The optical divider 671 distributes optical signal transmitted through the optical waveguide 240 in optical frequency division multiplexing fashion to the optical frequency selection and conversion elements 605-1~M to be sent to the optical waveguides 241-1~M. The distributed multiplexed signals are subjected to optical frequency selection and conversion in the second optical frequency selection and conversion elements in accordance with the frequency selection and conversion control signals 654-1~M. Difference between the circuits of FIGS. 11A and 11B is that the former must use the complicated optical frequency selector or frequency fixed optical frequency selector and a main portion of optical power supplied to the optical frequency conversion element is coupling loss of optical components and relatively small whereas the latter employs inexpensive optical components such as optical divider and optical power supplied to the optical frequency selection and conversion element is attenuated to one M-th by optical divider. When assignment of the frequency is fixed or semi-fixed, the circuit of FIG. 11A is mainly used, and when assignment of the frequency is dynamic, the circuit of FIG. 11B is mainly used.

Figure 1:
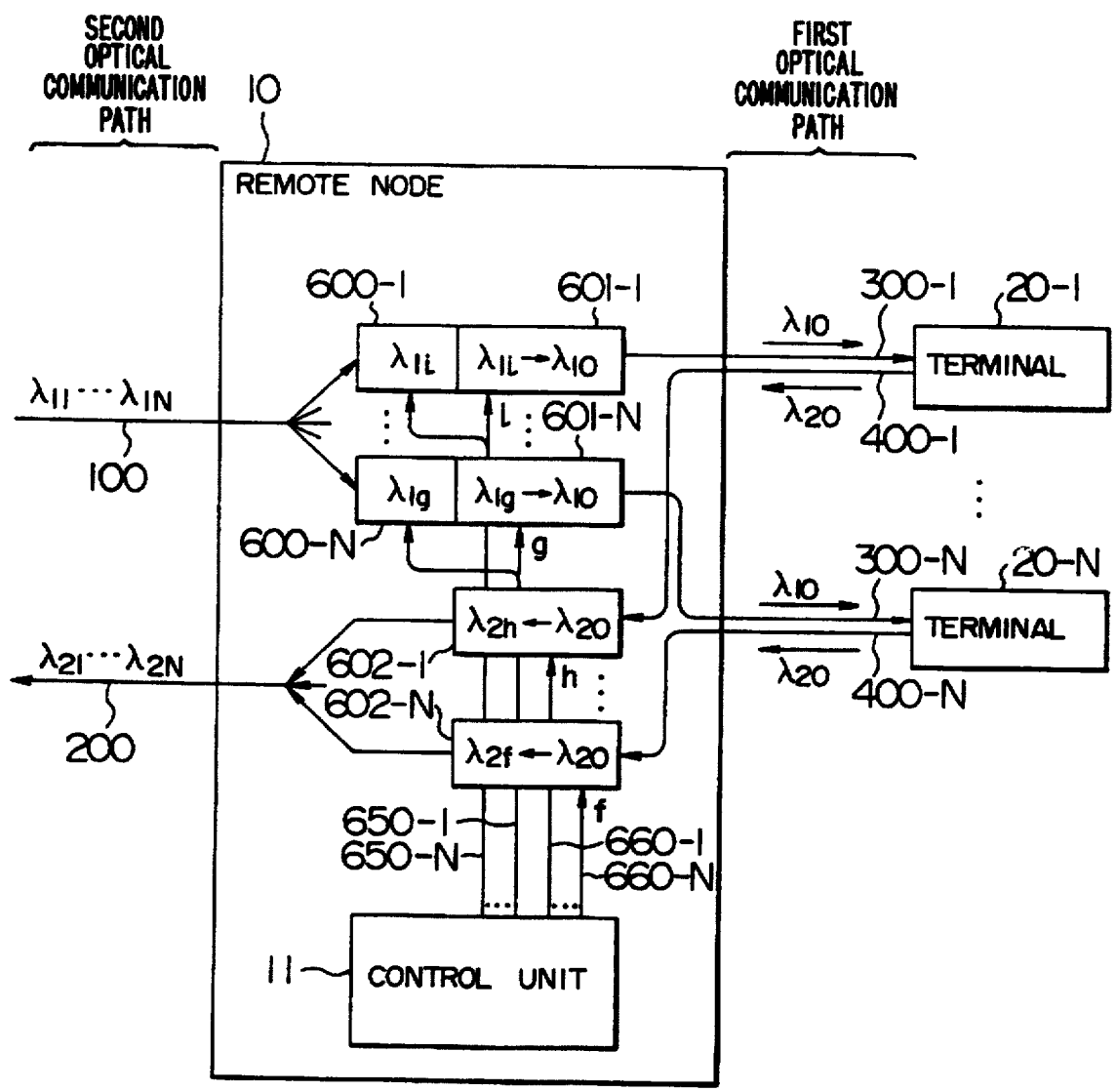
FIG. 1 schematically illustrates a basic logical configuration of the present invention.
Figure 2:
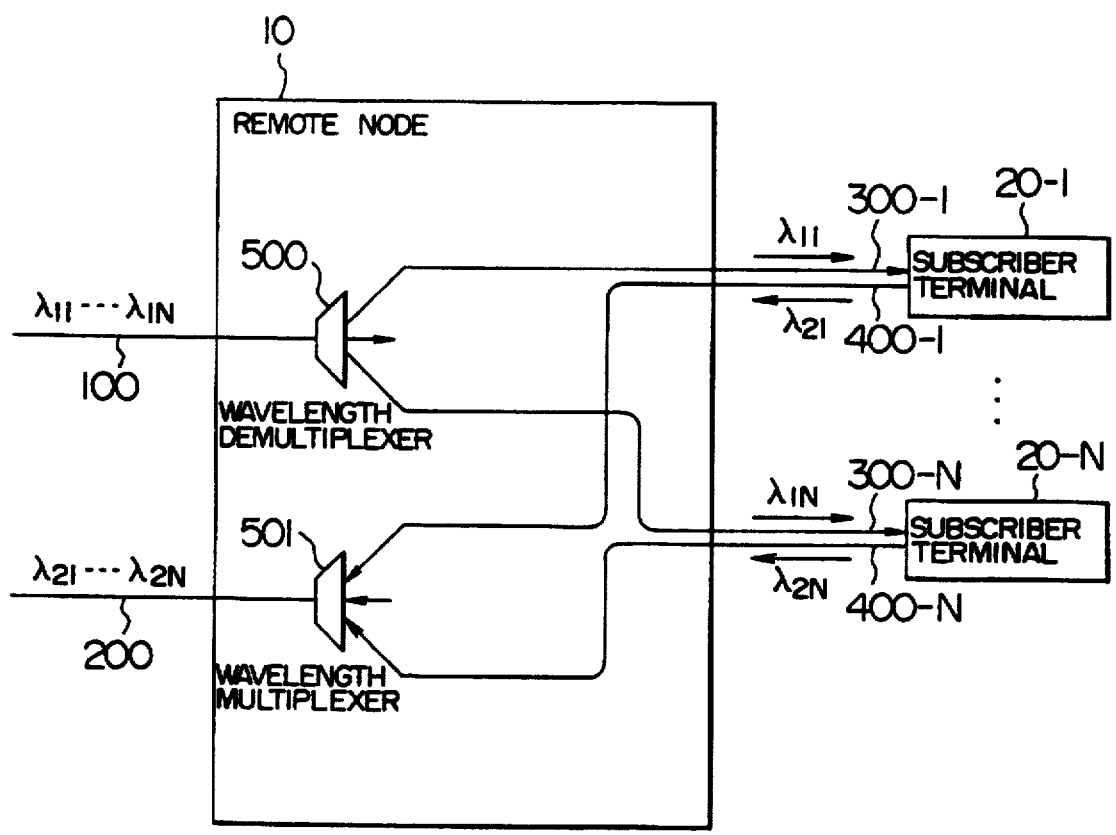
FIGS. 2 and 3 schematically illustrate prior art configurations.
Figure 3:
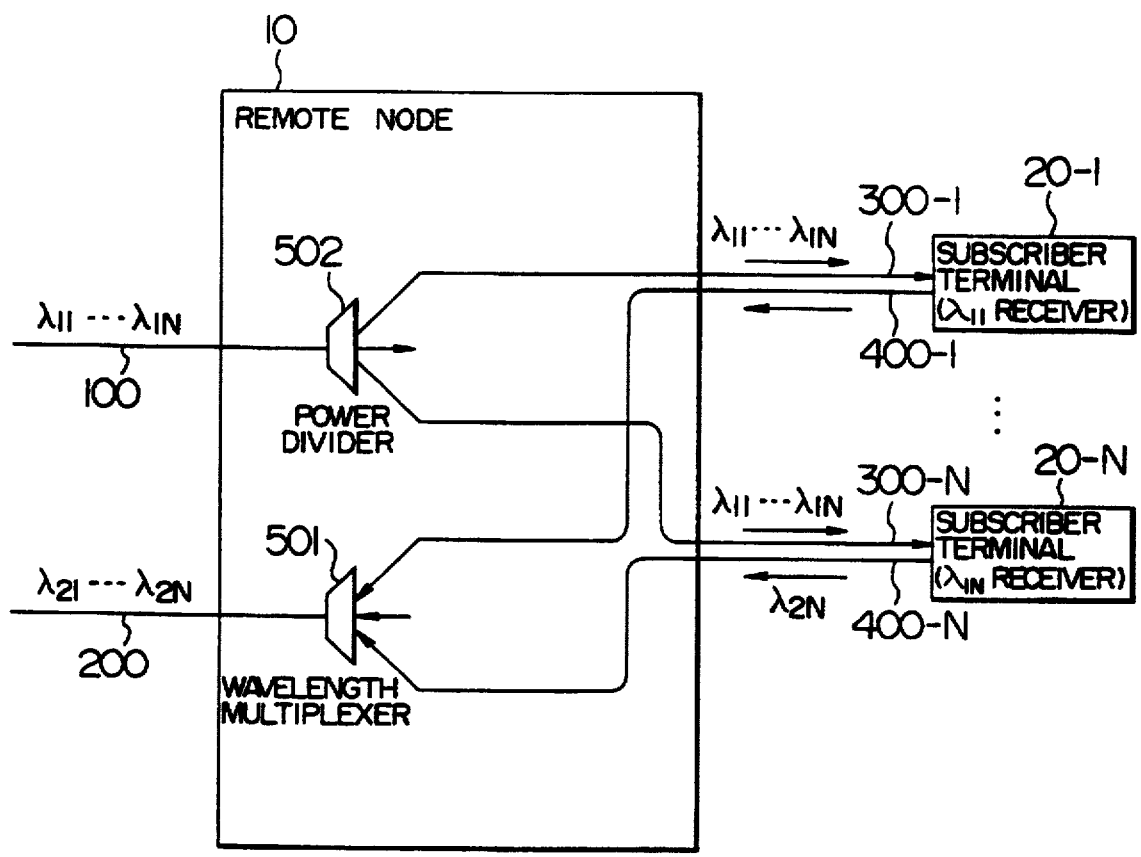
Figure 12:
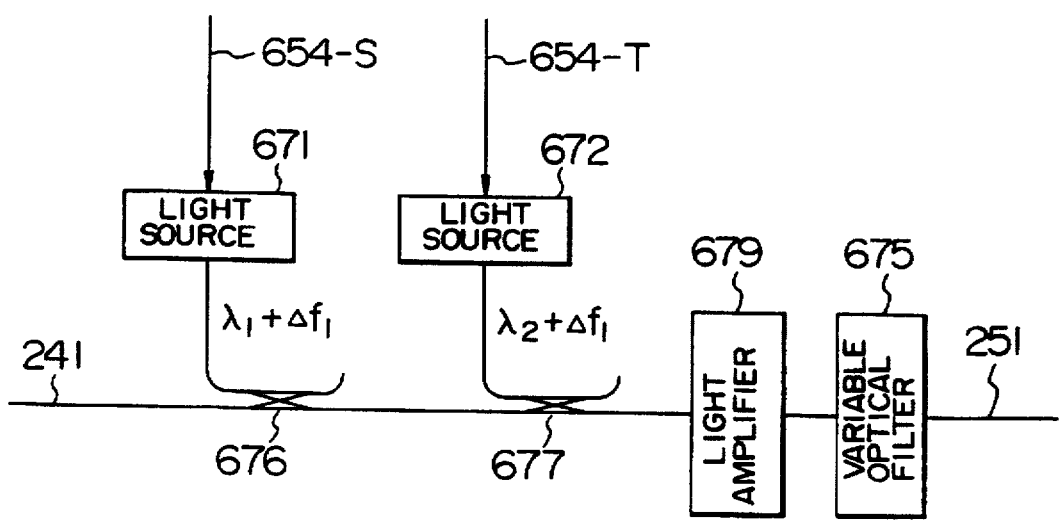
FIG. 12 schematically illustrates a configuration of an optical frequency conversion element.

As the optical frequency conversion element, there are known (a) an optoelectronic integrated circuit having the function that a signal is converted into an electric signal by a receiver and an optical frequency variable light emitting element is used to convert the electric signal into an optical signal, (b) a frequency shifter in which optical signal and modulation light for frequency to be shifted are added to non-linear optical material simultaneously, (c) a frequency shifter using a polarizing rotation element, (d) an optical frequency conversion element having an optical filter for converting into an ASK (amplitude shift keying) signal and an optical frequency variable laser for converting into an FSK (frequency shift keying) signal, and (e) an optical frequency conversion element using four-light wave mixture. As the optical frequency selection and conversion element, there are known (a) an optical frequency conversion element using four-light wave mixture and (b) an integrated element having a combination of the optical frequency conversion element and a variable light filter using a laser. Any of them can be applied to the embodiment, while the optical frequency conversion element using four-light wave mixture is actually employed in the embodiment. The optical frequency conversion element using the four-light wave mixture has the same configuration as that described in FIG. 2 of paper by G. Grosskopf, R, Ludwig, H. G. Weber, "140 Mbit/s DPSK Transmission Using An All-Optical Frequency Converter With A 400 GHz conversion Range", Electronics Letters, Vol. 24, No. 17, pp. 1106–1107. According to the paper, a frequency of an input signal Sin is shifted by $\Delta f_2$ by light emitting sources P1 and P2 having a frequency separated by $\Delta f_1$ from that of the input signal Sin. FIG. 12 schematically illustrates a configuration thereof. It comprises light sources 671 and 672, a light amplifier 679, a variable light filter 675, and optical multiplexers 676 and 677. The light sources 671 and 672 correspond to lasers P1 and P2 shown in FIG. 2 described in the above paper, respectively, and the light amplifier 673 corresponds to the light amplifier shown in FIG. 2 of the above paper. In the embodiment, a frequency of the light source 671 is set to a frequency $(\lambda_1 + \Delta f_1)$ separated by $\Delta f_1$ from an indication frequency $(\lambda_2)$ in accordance with a selection indication signal 654-S for indicating a selection frequency, of frequency control signals 654 and a frequency of the light source 672 is set to a frequency $(\lambda_2 + \Delta f_1)$ separated by $\Delta f_1$ from an indication frequency $(\lambda_2)$ in accordance with a conversion indication signal 654-T for indicating the converted optical frequency. By setting in this manner, signal having optical frequency $\lambda_1$ is shifted by a difference between optical frequencies of the lasers 671 and 672. Consequently, the converted optical frequency becomes a desired optical frequency given by:

$$\lambda_1 - \{(\lambda_1 + \Delta f_1) - (\lambda_2 + \Delta f_1)\} = \lambda_2$$

The optical signal capable of being optical frequency converted in this manner has a limitation as described in the above-mentioned paper (page 1106, left column, fifth line from bottom) and is determined by a life time of a carrier of the light amplifier 679 in the embodiment and is within about 10 GHz lower than $\lambda_1$. The optical frequencies of optical signals therein are all shifted. When this operation is utilized, two or more optical signals can be shifted simultaneously. On the contrary, optical signals having a frequency higher than the frequency disappear. At this time, in order to exactly suppress signals other than desired optical frequency, the variable filter is used. In this manner, selection and conversion of optical frequency can be made. Optical signals having a plurality of optical frequencies can be selected and converted simultaneously.

Figure 13:
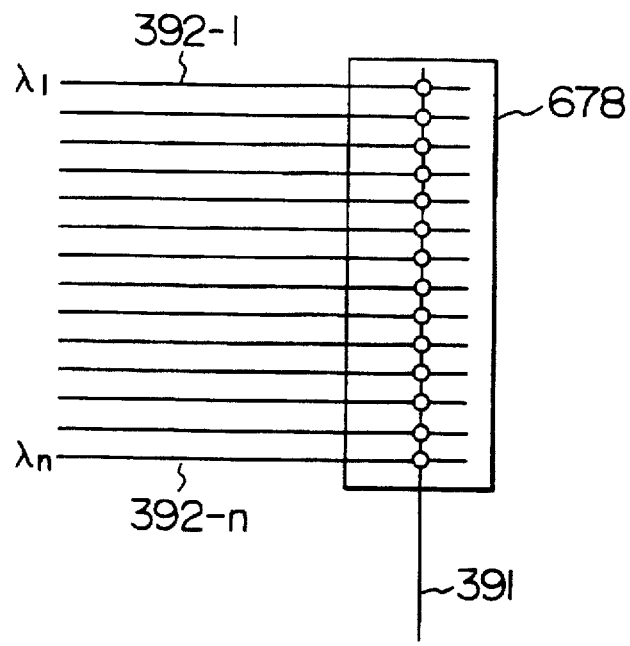
FIG. 13 schematically illustrates a configuration of a variable wavelength optical source of the optical conversion element.

The light sources 671 and 672 adopt (a) a wavelength variable LD or (b) a system in which an optical signal having one optical frequency is selected by primary optical space switch 678 from optical signals having optical frequencies $\lambda_{1-n}$ distributed through optical waveguides 392-1-~n from standard optical source shown in FIG. 13 to be sent to optical waveguide 391.

Figure 7:
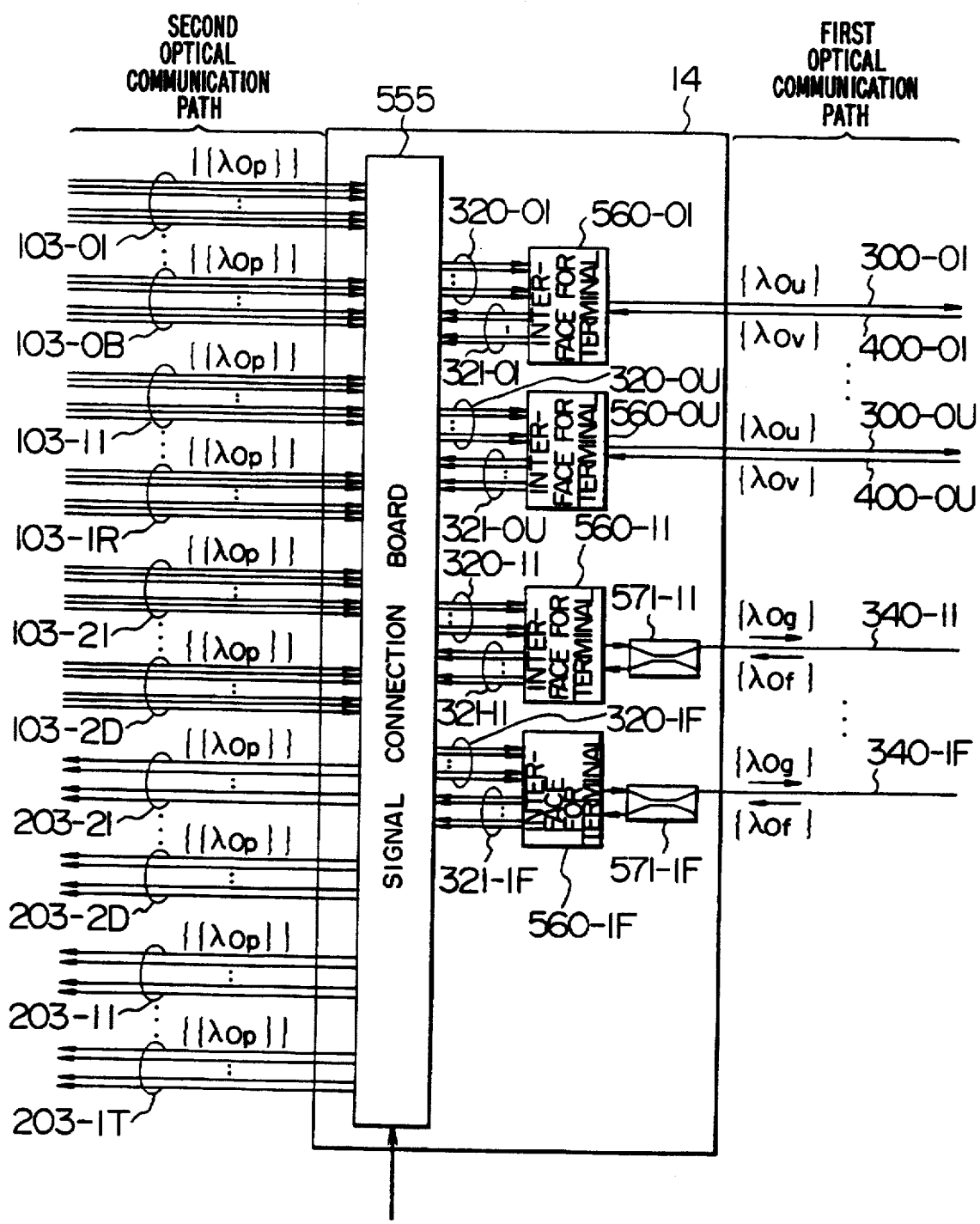
FIG. 7 schematically illustrates a configuration of an interface of a terminal.

FIG. 7 schematically illustrates a configuration of the terminal interface unit 14. The terminal interface unit 14 comprises interfaces 560-1~U corresponding to the terminal networks 20-01~U, bi-directional multiplexing/demultiplexing portions 571-1~F corresponding to the terminal networks 20-11~F, terminal corresponding interfaces 560-1~F, and a signal connection board 555. Signals transmitted from the terminal networks 20-01~U are divided/demultiplexed in the terminal interfaces 560-01~U if necessary and are distributed to the optical waveguide bundles 103-ij (where ij=01~B, 11~R, and 21~D) while signals transmitted from the terminal networks 20-11~F are demultiplexed by the bi-directional multiplexing/demultiplexing portions 571-1~F and are then divided/demultiplexed in the terminal interfaces 560-11~F if necessary to be distributed to the optical waveguide bundles 103-ij (ij=01~B, 11~R, and 21~D). Signals from the optical waveguide bundles 201-ij (ij=11~T and 21~D) are distributed to the terminal corresponding interfaces 560-01~U 560-11~F in the signal connection board 555 and multiplexed if necessary to be transmitted through the optical waveguides 300-01~U to the terminal networks 20-01~U, while signals of optical waveguides 300-11~F are multiplexed by the bi-directional multiplexing/demultiplexing portions 571-1~F and transmitted through optical waveguides 340-11~F to the terminal networks 20-11~F. The optical signal distribution and collection portion 555 re-assembles signals from the optical frequency conversion unit 13 in corresponding manner to the terminal networks and distributes the signals to the terminal interfaces 560-01~U and 560-11~F. Further, optical signals from the terminal interfaces 560-01~U and 560-11~F are distributed to optical waveguides designated by the optical frequency conversion unit 13.

Figure 14:
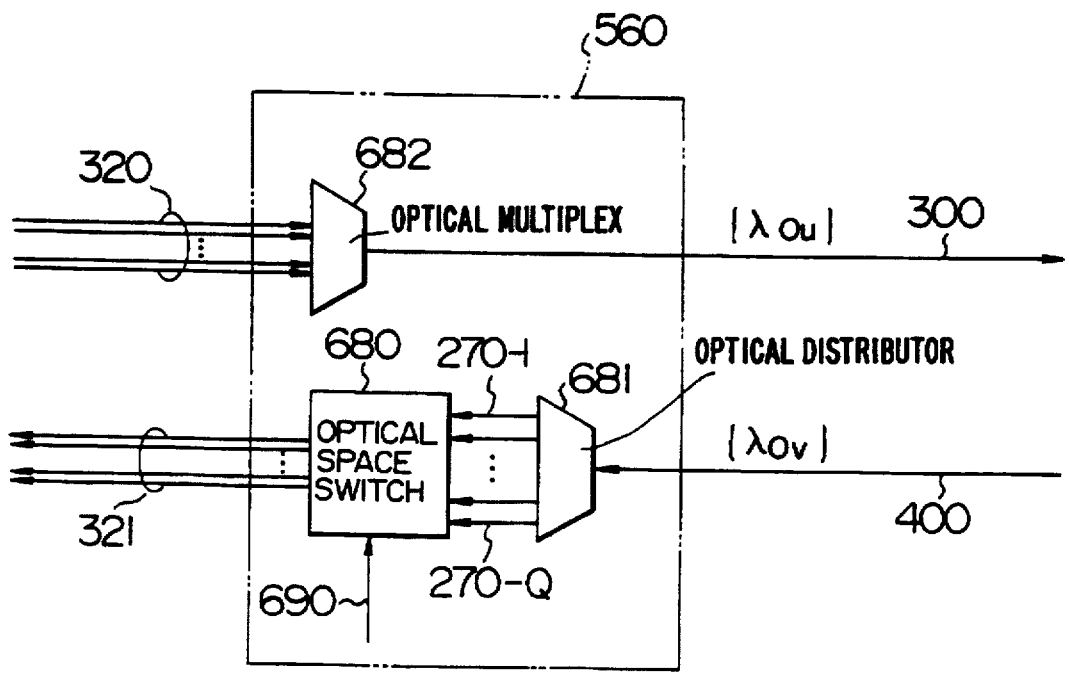
FIG. 14 schematically illustrates a configuration of a terminal corresponding interface.

FIG. 14 schematically illustrates a configuration of the terminal interface 560. The terminal interface 560 comprises an optical distributor 681 constituted by an optical divider or an optical demultiplexer, a space switch 680, an optical multiplexer 682 and optical waveguides 270-1~Q. Signal having optical frequency $\{\lambda_{ov}\}$ transmitted through optical fiber 300 from terminal is distributed to predetermined optical frequency by the optical distributor 681 and is sent to the optical space switch 680 through the optical waveguides 270-1~Q. The optical space switch 680 distributes the signal supplied through the optical waveguides 270-1~Q to the optical waveguide bundle 321 in accordance with control signal 690 produced from the control unit 11. On the contrary, signals transmitted through the optical waveguide bundle 320 are multiplexed by the optical multiplexer 682 and are sent through the fiber 300 to the terminal network or the bi-directional multiplexing/demultiplexing portion 571. However, when Q is 1, there is a case where the optical demultiplexer 681 and the space switch 680 are omitted and the space switch 680 is composed of a mere optical waveguide wiring. Further, there is a case where one or more second optical multiplexers are connected between the optical distributor 681 and the space switch 680 depending on assignment of optical frequency to multiplex signals distributed by the optical distributor 681. In addition, there is a case where one or more optical frequency filters are connected between the optical distributor 681 and the space switch 680 to send only part of signals distributed by the optical distributor 681 to the space switch 680.

Figure 15:
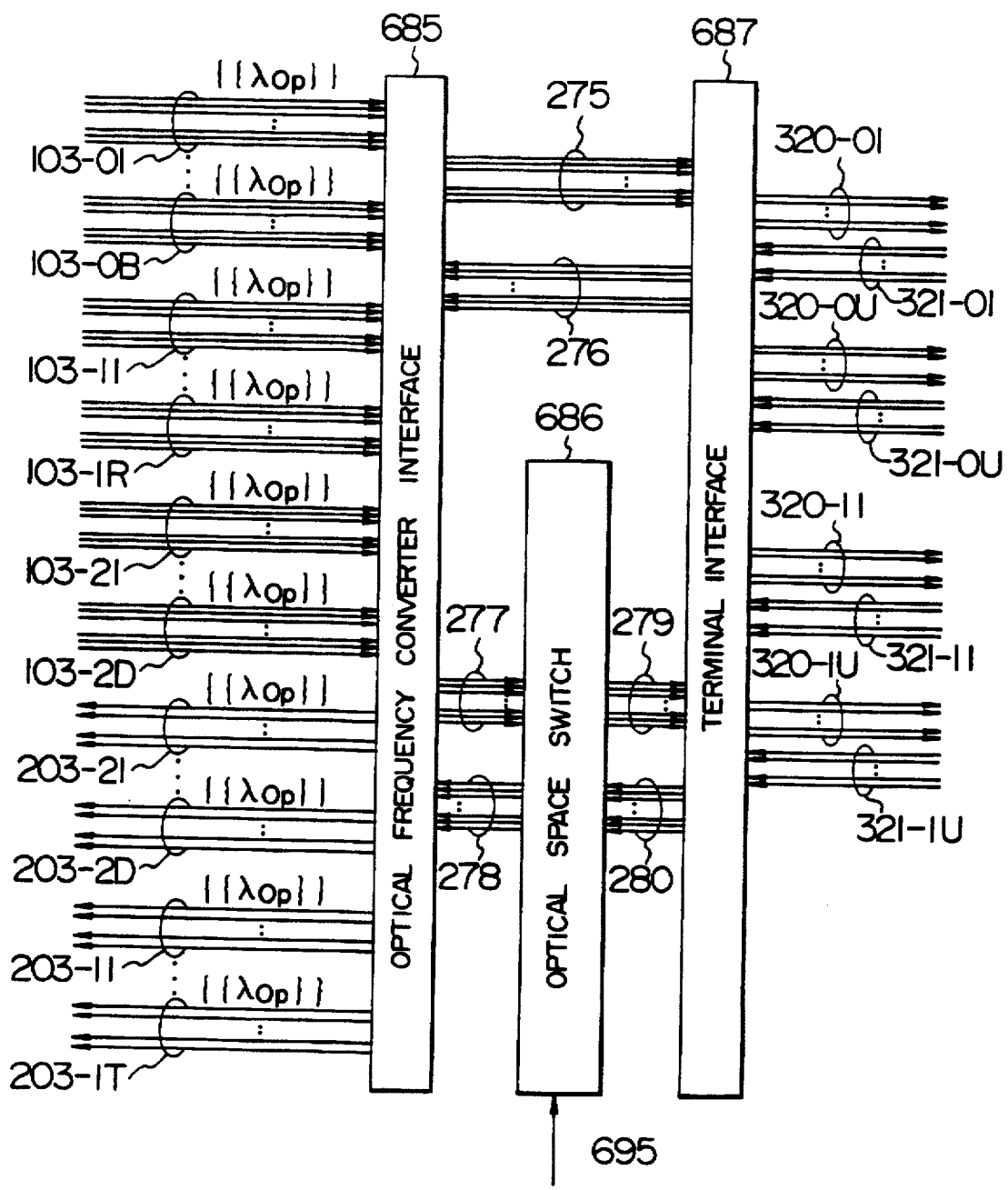
FIG. 15 schematically illustrates an optical signal distribution and collection portion.

FIG. 15 schematically illustrates a configuration of the optical signal distribution and collection portion 555. The optical signal distribution and collection portion 555 comprises an optical frequency converter interface 685, an optical space switch 686, a terminal interface 687, and optical waveguide bundles 275, 276, 277, 278, 279 and 280. The optical frequency converter interface 685 distributes signals to which circuits or lines are set by the optical space switch 686, of signals from the optical frequency conversion unit 13 and fixed lines to the optical waveguide bundles 275 and 277, respectively, whereas re-assembles signals supplied through the optical waveguide bundles 276 and 278 in corresponding manner to the optical frequency conversion unit 13. The terminal terminator interface 687 distributes signals to which circuits or lines are set by the optical space switch 686, of signals from the terminal interface 560 and fixed lines to the optical waveguide bundles 280 and 276, respectively, whereas the interface 687 re-assembles signals supplied through the optical waveguide bundles 275 and 279 in corresponding manner to the terminal interface. The optical frequency converter interface 685 and the terminal corresponding terminator interface 687 have the same configuration and include a combination circuit of an optical distributor having an optical divider or an optical demultiplexer, an optical multiplexer, an optical waveguide wiring and an optical frequency filter.

FIGS. 8A, 8B and 9 schematically illustrate the terminal network 20. FIGS. 8A and 8B illustrate a terminal network including two wire optical fiber cables each transmitting up and down signals, respectively, and FIG. 9 illustrates a terminal network including a single optical fiber cable for transmitting up and down signals in optical frequency division multiplexing fashion.

FIG. 8A illustrates a configuration in which one or a plurality of first terminal nodes 22-1~q and a terminating portion 21 are connected in series through two fibers 300, 322-1~q, 400 and 422-1~q, and FIG. 8B illustrates a configuration in which one or a plurality of second terminal nodes 23-1~p are connected in open loop through fibers 300 and 322-1~p (322-p=400). In FIG. 8A, there is a case where the terminating portion 21 is integrated into the terminal node 22-q.

FIG. 9 illustrates a configuration in which one or a plurality of third terminal nodes 25-1~r and a terminating portion 24 are connected in series through single fiber 340 and 345-1~r. There is a case where the terminating portion 24 is integrated into the terminal node 25-r.

Figure 16A:
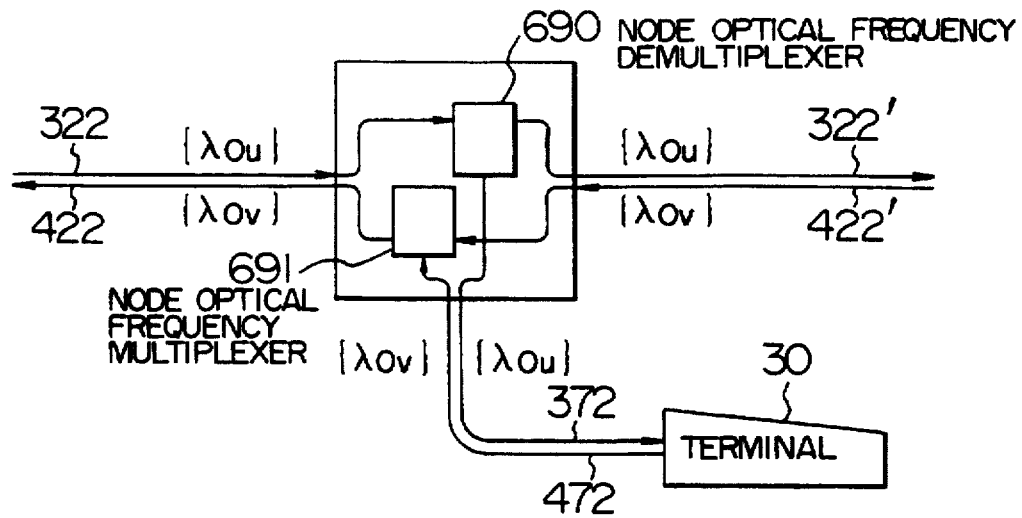
FIGS. 16A, 16B, 17A, 17B, 18A and 18B schematically illustrate configurations of terminal nodes.
Figure 16B:
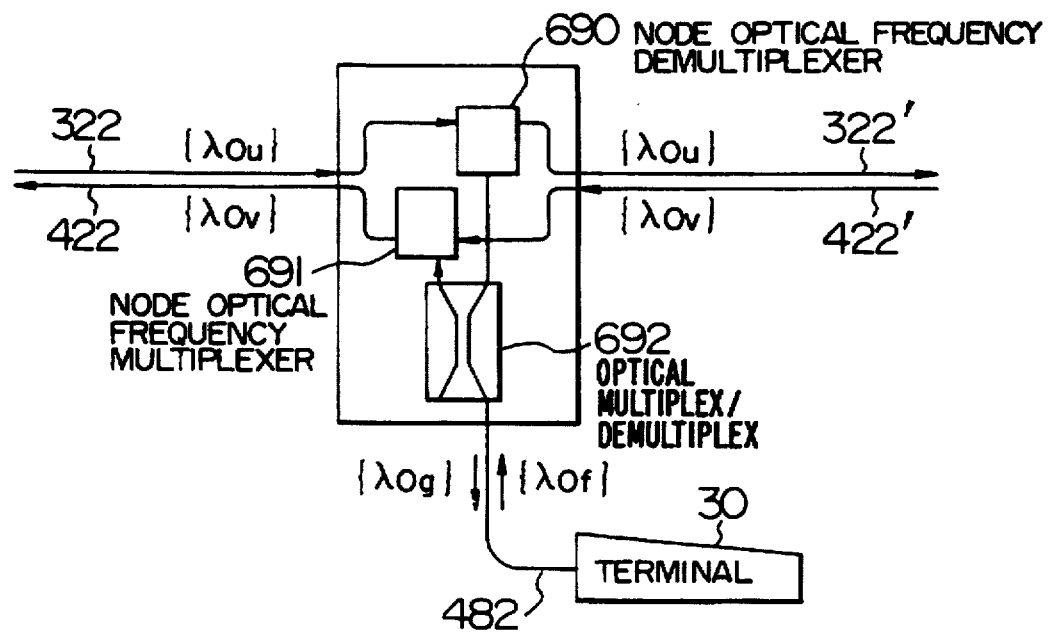

FIGS. 16A and 16B schematically illustrate configurations of the first terminal node 22. The first terminal node of FIG. 16A comprises fibers 322 and 422 connected to the node, that is, the remote node or a terminal node which is connected nearer to the node and adjacent to this first terminal node, fibers 322' and 422' connected to a next terminal node, a terminal 30 connected through two fibers 372 and 472 to transmit up and down signals, a node optical frequency demultiplexer 690 and a node optical frequency multiplexer 691. Signal transmitted through the optical fiber 322 is demultiplexed or divided or optical frequency converted or optical frequency selected/converted if necessary by the optical frequency demultiplexer 690 to be transmitted through the optical fiber 372 to the terminal 30. The remaining optical signals of the optical frequency demultiplexer 690 are transmitted through the optical fiber 322' to the next terminal node as they are. Signal transmitted through the optical fiber 472 from the terminal 30 is optical wavelength converted by the node optical frequency multiplexer 691 if necessary and is multiplexed with signals from the optical fiber 422' to be transmitted to the optical fiber 422. The first terminal node 22 shown in FIG. 16B comprises fibers 322 and 422 connected to the node or a terminal node which is connected nearer to the node and adjacent to this first terminal node, fibers 322' and 422' connected to a next terminal node, a terminal 30 connected through a fiber 482 to transmit up and down signals in optical frequency division multiplexing fashion, a node optical frequency demultiplexer 690, a node optical frequency multiplexer 691 and an optical multiplexer/demultiplexer 692. Signal transmitted through the optical fiber 322 is demultiplexed or divided or optical frequency converted or optical frequency selected/converted if necessary by the optical frequency demultiplexer 690 and is optical frequency multiplexed by the optical multiplexer/ demultiplexer 692 to be transmitted through the optical fiber 472 to the terminal 30. The remaining optical signals of the optical frequency demultiplexer 690 are transmitted through the optical fiber 322' to the next terminal node as they are. Signal transmitted through the optical fiber 482 from the terminal 30 is demultiplexed by the optical multiplexer/demultiplexer 692 and is optical wavelength converted by the node optical frequency multiplexer 691 if necessary and is multiplexed with signals from the optical fiber 422' to be transmitted to the optical fiber 422.

Figure 17A:
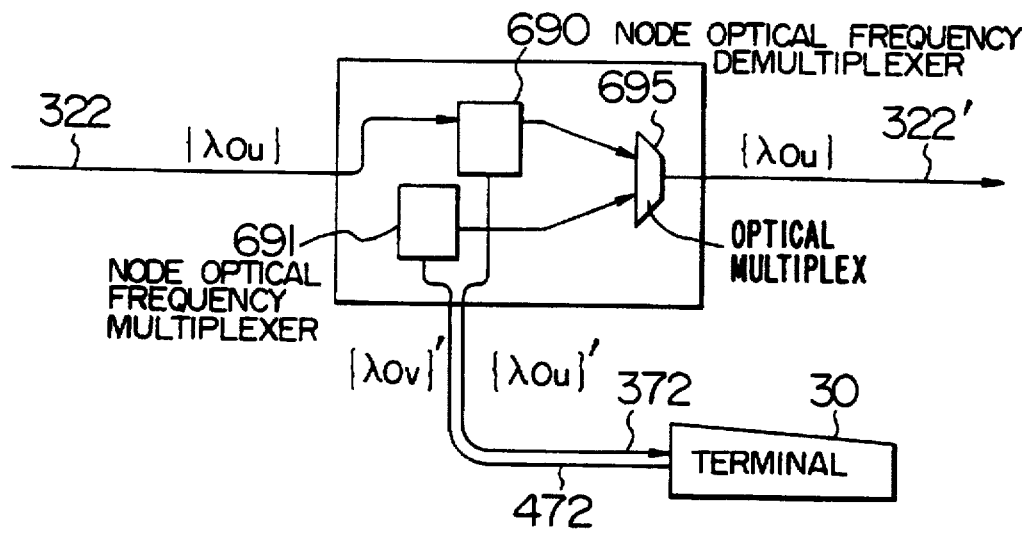
Figure 17B:
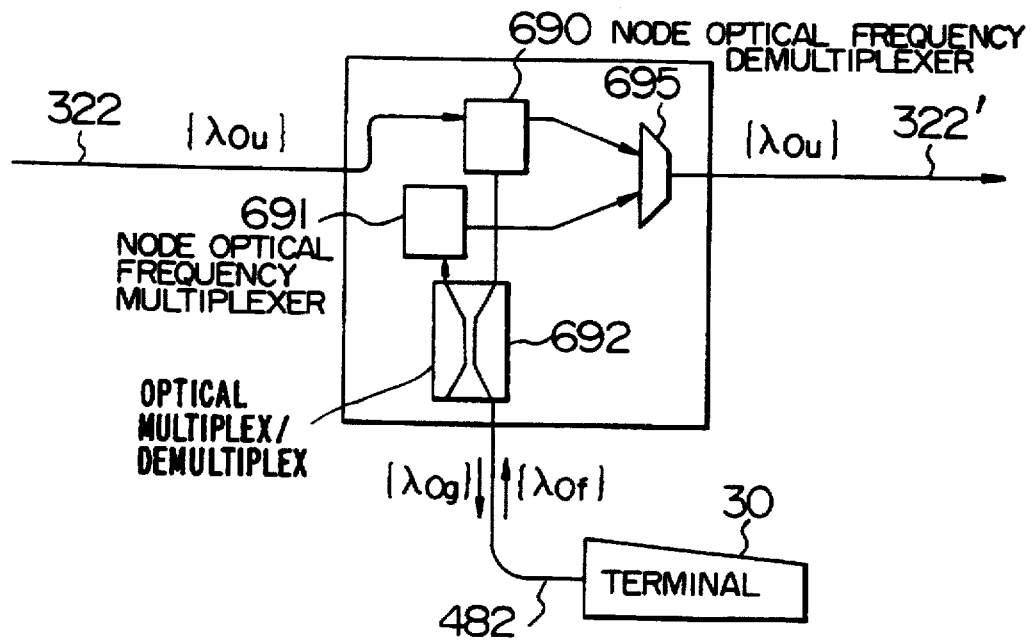

FIGS. 17A and 17B schematically illustrate configurations of the second terminal node 23. The second terminal node 23 shown in FIG. 17A comprises a fiber 322 connected to the node, that is, the remote node or a terminal node which is connected nearer to the node and adjacent to this second terminal node, a fiber 322' connected to a next terminal node, a terminal 30 connected through two fibers 372 and 472 to transmit up and down signals, a node optical frequency demultiplexer 690, a node optical frequency multiplexer 691 and an optical multiplexer 695. Signals transmitted through the optical fiber 322 are optically demultiplexed or divided or if necessary optical frequency converted or optical frequency selected/converted by the optical frequency demultiplexer 690 to be transmitted to the terminal 30 through the optical fiber 372. Signals transmitted through the optical fiber 472 from the terminal 30 are optical wavelength converted by the node optical frequency multiplexer 691 if necessary and are multiplexed with optical signals from the optical frequency demultiplexer 690 by the optical multiplexed 695 to be sent to the optical fiber 322'. The second terminal node 23 shown in FIG. 17B comprises a fiber 322 connected to the node, that is, the remote node or a terminal node which is connected nearer to the node and adjacent to this second terminal node, a fiber 322' connected to a next terminal node, a terminal 30 connected through fiber 482 to transmit up and down signals in optical frequency division multiplexing fashion, a node optical frequency demultiplexer 690, a node optical frequency multiplexer 691, an optical multiplexer/demultiplexer 692 and an optical multiplexer 695. Signals transmitted through the optical fiber 322 are optically demultiplexed or divided or if necessary optical frequency converted or optical frequency selected/converted by the optical frequency demultiplexer 690 and are optical frequency multiplexed by the optical multiplexer/ demultiplexer 692 to be transmitted to the terminal 30 through the optical fiber 482. Signals transmitted through the optical fiber 482 from the terminal 30 is demultiplexed by the optical multiplexer/ demultiplexer 692, are optical wavelength converted by the node optical frequency multiplexer 691 if necessary and are then multiplexed with the optical signals from the optical frequency demultiplexer 690 by the optical multiplexer 695 to be sent to the optical fiber 322'.

Figure 18A:
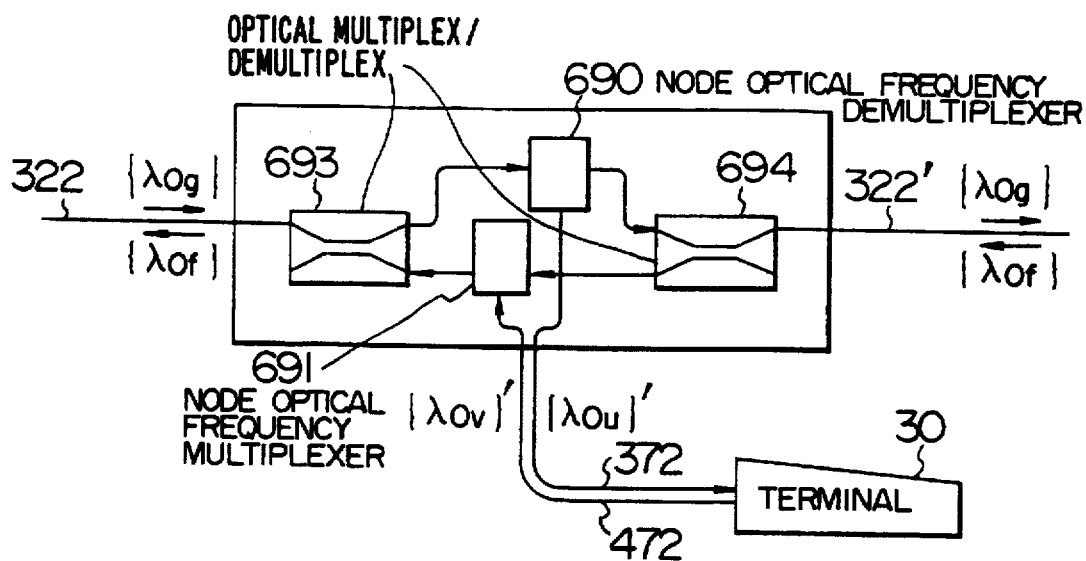
Figure 18B:
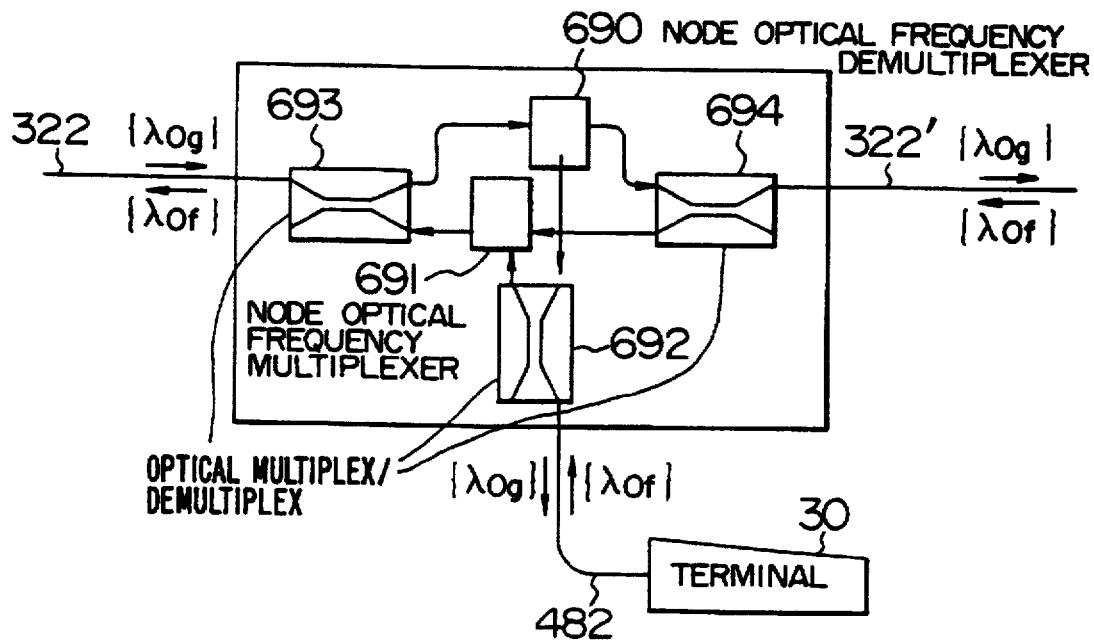

FIGS. 18A and 18B schematically illustrate configurations of the third terminal node 24. The third terminal node 24 of FIG. 18A comprises a fiber 322 connected to the node, that is, the remote node or a terminal node which is connected nearer to the node and adjacent to this third terminal node, a fiber 322' connected to a next terminal node, a terminal 30 connected through two fibers 372 and 472 to transmit up and down signal, a node optical frequency demultiplexer 690, a node optical frequency multiplexer 691 and optical multiplexer/demultiplexer 693 and 694. The optical multiplexer/demultiplexer 693 demultiplexes transmitted signals of bi-directional signals on the fiber 322 to be sent to the node optical frequency demultiplexer 690 and multiplexes signals from the node optical frequency multiplexer 691 to be sent to the fiber 322 as bi-directional signals. The optical multiplexer/demultiplexer 694 multiplexes signals from the node optical frequency demultiplexer 690 to be sent to the fiber 322' as bi-directional signals and demultiplexes transmitted signals of bi-directional signals on the fiber 322' to be sent to the node optical frequency multiplexer 691. Signals transmitted through the optical fiber 322 are optically demultiplexed or divided or if necessary optical frequency converted or optical frequency selected/converted by the node optical frequency demultiplexer 690 to be transmitted through the optical fiber 372 to the terminal 30. The remaining signals of the node optical frequency demultiplexer 690 is sent to the optical multiplexer/demultiplexer 694. Signals transmitted through the optical fiber 472 from the terminal 30 are optical wavelength converted by the node optical frequency multiplexer 691 if necessary and are multiplexed with signals from the optical multiplexer/demultiplexer 694 to be sent to the optical multiplexer/demultiplexer 693. The third terminal node 23 shown in FIG. 18B comprises fibers 322 connected to the node, that is, the remote node or a terminal node which is connected nearer to the node and adjacent to this third terminal node, a fiber 322; connected to a next terminal node, a terminal 30 connected through fiber 482 to transmit up and down signals in optical frequency division multiplexing fashion, a node optical frequency demultiplexer 690, a node optical frequency multiplexer 691, an optical multiplexer/demultiplexer 692 and optical multiplexers/demultiplexers 693 and 694. The optical multiplexers/demultiplexers 693 and 694 have the same function as that of the optical multiplexers/ demultiplexers 693 and 694. Signals transmitted through the optical fiber 322 are optically demultiplexed or divided or if necessary optical frequency converted or optical frequency selected/ converted by the optical frequency demultiplexer 690 and are optical frequency multiplexed by the optical multiplexer/ demultiplexer 692 to be transmitted to the terminal 30 through the optical fiber 482. Signals transmitted through the optical fiber 482 from the terminal 30 is demultiplexed by the optical multiplexer/demultiplexer 692, are optical wavelength converted by the node optical frequency multiplexer 691 if necessary and are then multiplexed with the optical signals from the optical frequency demultiplexer 690 by the optical multiplexer 695 to be sent to the optical fiber 322'.

Figure 19A:
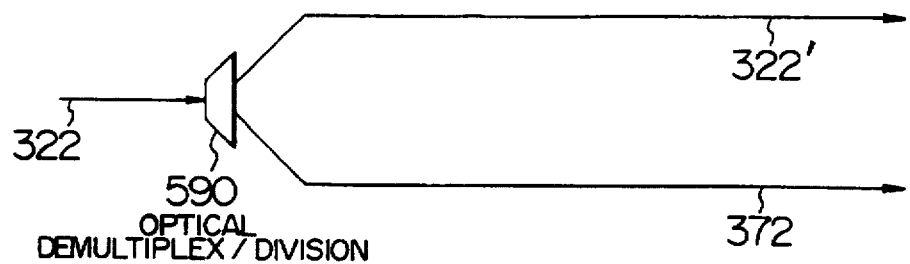
FIGS. 19A to 19C schematically illustrate configurations of an optical frequency demultiplexer of a node.
Figure 19B:
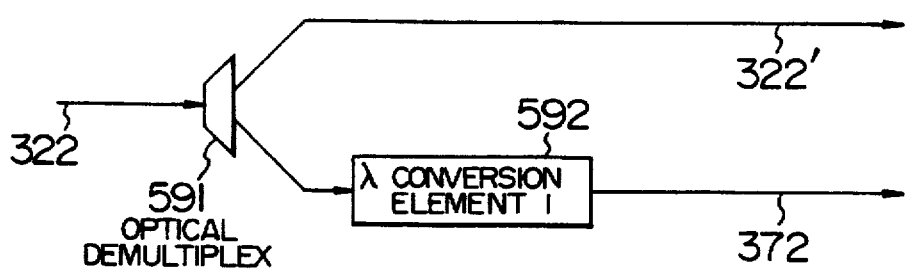
Figure 19C:
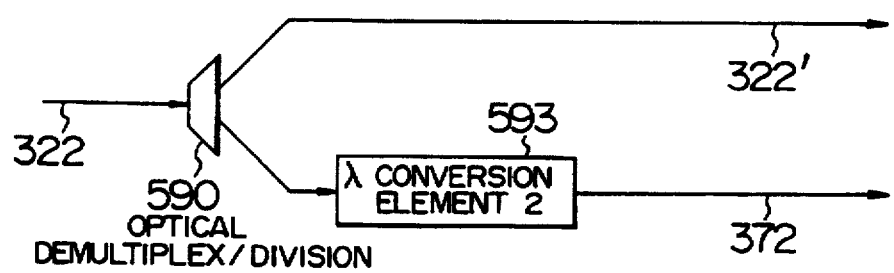

FIGS. 19A to 19C schematically illustrate configurations of the node optical frequency demultiplexer 690. As the node optical frequency demultiplexer 690, one of three kinds of configurations shown in FIGS. 19A, B and C or a combination thereof is employed in accordance with the presence of reception of broadcasting signal or receivable optical frequency of terminal or cost. The node optical frequency demultiplexer shown in FIG. 19A includes an optical demultiplexer or optical divider 590. Optical signal is demultiplexed by the optical demultiplexer or optical divider 590 to be sent to the terminal. The node optical frequency demultiplexer shown in FIG. 19B includes an optical demultiplexer 591 and an optical frequency conversion element 592. Optical signal selected and demultiplexed by the optical demultiplexer 591 is optical frequency converted by the optical frequency conversion element 592 to be sent to the terminal. The node optical frequency demultiplexer 690 shown in FIG. 19B includes an optical demultiplexer or optical divider 590 and an optical frequency selection/conversion element 593. Optical signal demultiplexed by the optical demultiplexer or optical divider 590 is optical frequency selected/ converted by the optical frequency selection/conversion element 593 to be sent to the terminal.

Figure 20:
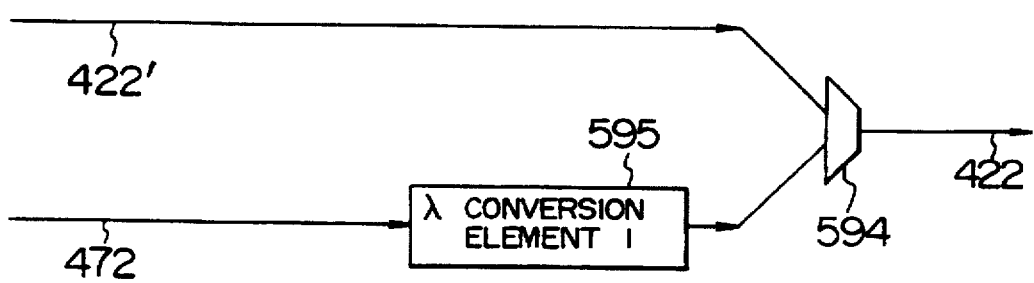
FIG. 20 schematically illustrates a configuration of an optical signal multiplexer of a node.

FIG. 20 schematically illustrates a configuration of the node optical frequency multiplexer 691. The node optical frequency multiplexer 691 comprises an optical multiplexer 594 and an optical frequency conversion element 595. Signals from the terminal are optical frequency converted by the optical frequency conversion element 595 and are multiplexed by the optical multiplexed 594. There is a case where the optical frequency conversion element 595 is omitted depending on a cost and signal optical frequency of terminal.

In the embodiment, the terminal node is provided in each terminal in order to increase the reliability between terminals, while a plurality of terminals can be connected to one terminal node as in the prior art. There are star, loop and ring connections.

The optical demultiplexer, optical divider, optical multiplexer and optical multiplexer/demultiplexer are known technique to those skilled in the prior art and are used heretofore and in other transmission apparatuses or the like.

In the embodiment, with signals which do not require the optical frequency conversion, the optical frequency conversion can be omitted in the optical frequency conversion unit 13 or the terminal nodes 21 to 25.

In the embodiment, the bundle includes a single wire or line or waveguide in accordance with a network scale or configuration.

According to the present invention, since the signal from the upper node is optical frequency selected and converted to the optical frequency assigned to each terminal to which the signal is to be transmitted in the node, the privacy between the terminal networks is ensured.

Further, since the signal from the terminal network is optical frequency converted in the node to be sent to the upper node, a failure in the terminal network does not influence the whole system and accordingly the network system with high reliability can be attained.

In addition, since the optical frequency of the terminal and the optical frequency of the signal between the node and the upper node are assigned independently and dynamically, the network with high reliability and flexibility can be attained.

The signals between the node and the upper node can be multiplexed in extremely high density by the coherent technique and a large capacity of information can be exchanged.

Further, since the optical frequency of the signals to be transmitted and received of the terminal is optical frequency converted in the terminal node and the node, the optical frequency can be common between the terminals. The same transmission and reception optical frequency can be used in the whole terminals. Thus, the optical frequency tuning in the terminal is unnecessary or simple, so that operability of the terminal is satisfactory and movement and replacement of the terminal are easy and the cost of the terminal is inexpensive.

Since the optical frequency is assigned flexibly, the form of the terminal network and the degree of freedom in the transmission system are wide.

We claim:

1. A method for transmitting optical signals to terminals comprising the steps of:

receiving first optical signals in optical frequency division multiplexing fashion through an optical communication path;

demultiplexing said first optical signals in optical frequency division multiplexing fashion to second optical signals having a first common optical frequency; and distributing said second optical signals having the first common optical frequency to the corresponding terminals.

2. The method for transmitting optical signals according to claim 1, wherein said demultiplexing step comprises the steps of:

selecting said first optical signals corresponding to the respective terminals; and converting said first optical signals to said second optical signals having said first common optical frequency, respectively.

3. The method for transmitting optical signals to terminals comprising the steps of:

receiving first optical signals in optical frequency division multiplexing fashion through an optical communication path;

demultiplexing said first optical signals in optical frequency division multiplexing fashion to second optical signals having a first common optical frequency; and distributing said second optical signals having the first common optical frequency to the corresponding terminals;

receiving third optical signals having a second common optical frequency from said terminals;

converting said third optical signals having the second common optical frequency to fourth optical signals in optical frequency division multiplexing fashion, the second common optical frequency being independent of the optical frequencies of said fourth optical signals; and sending said fourth optical signals in optical frequency division multiplexing fashion to said optical communication path.

4. The method for transmitting optical signals according to claim 3, wherein said first common optical frequency is equal to said second common optical frequency.

5. A method for transmitting optical signals to an optical communication path comprising the steps of:

receiving first optical signals having a common optical frequency from terminals;

multiplexing said first optical signals having the common optical frequency to second optical signals in optical frequency division multiplexing fashion; and sending said second optical signals in optical frequency division multiplexing fashion to said optical communication path.

6. The method for transmitting optical signals according to claim 5, wherein said multiplexing step comprising the steps of:

converting said first optical signals having the common optical frequency to second optical signals, respectively; and combining said second optical signals in optical frequency division multiplexing fashion.

7. An optical frequency division multiplexing network comprising:

a plurality of first optical communication paths connected to a plurality of terminals;

a second optical connection path connected to outside; and a node including a selection unit for selecting, among signals transmitted through said second optical connection path in an optical frequency division multiplexing fashion, signals having optical frequencies to be sent to said plurality of terminals, a conversion unit for converting the selected signals to signals having a single optical frequency, and an output unit for supplying the converted signals to said plurality of terminals through said first optical communication paths.

8. A method for transmitting optical signals to terminals comprising the steps of:

receiving first optical signals in optical frequency division multiplexing fashion through an optical communication path;

demultiplexing said first optical signals in optical frequency division multiplexing fashion to second optical signals having a first common optical frequency, by a command signal in accordance with an assignment request for frequency; and distributing said second optical signals having the first common optical frequency to the corresponding terminals.

9. The method for transmitting optical signals to terminals according to claim 8, wherein said assignment request is fixed.

10. The method for transmitting optical signals to terminals according to claim 8, wherein said assignment request is fixed and when a failure occurs, a re-assignment request is made.

11. The method for transmitting optical signals to terminals according to claim 8, wherein said assignment request is made dynamically.

12. The method for transmitting optical signals to terminals according to claim 8, wherein said assignment request is from said terminals.

13. A method for transmitting optical signals to an optical communication path comprising the steps of:

receiving the first optical signals having a common optical frequency from terminals;

multiplexing said first optical signals having the common optical frequency to second optical signals in optical frequency division multiplexing fashion by a command signal in accordance with an assignment request for frequency; and sending said optical signals in optical frequency division multiplexing fashion to said optical communication path.

14. The method for transmitting optical signals to terminals according to claim 13, wherein said assignment is fixed.

15. The method for transmitting optical signals to terminals according to claim 13, wherein said assignment request is fixed and when a failure occurs, a re-assignment request is made.

16. The method for transmitting optical signals to terminals according to claim 13, wherein said assignment request is made dynamically.

17. An optical frequency division multiplexing network comprising:

a plurality of first optical communication paths connected to a plurality of terminals, respectively;

a second optical connection path connected to a remote site; and a node including a selection unit for selecting, among signals transmitted through said second optical connection path in an optical frequency division multiplexing fashion, signals having optical frequencies to be sent to said plurality of terminals, a conversion unit for converting the selected signals to signals having a common single optical frequency by a command signal in accordance with an assignment request for frequency, and an output for supplying the converted signals to a common frequency transmitted to said plurality of terminals through said first communication paths.

18. An optical frequency division multiplexing network comprising:

a plurality of first optical communication paths connected to a plurality of terminals, respectively;

a second optical connection path connected to a remote site; and a node including a terminal interface unit for receiving signals transmitted through said first optical connection path, signals having a common single optical frequency, a conversion unit for converting the received signals to signals to be sent to outside by a command signal in accordance with an assignment request for frequency, and an output for supplying the converted signals to a common frequency transmitted to outside through said second optical communication path in an optical frequency division multiplexing fashion.

19. A method for transmitting optical signals to terminals comprising the steps of:

receiving an input optical signal having at least first and second optical signals incorporated therein in optical frequency division multiplexing fashion with respect to each other, through an optical communication path;

demultiplexing said input optical signal to said at least first and second optical signals which have a first common optical frequency; and distributing said first and second optical signals having the first common optical frequency to differing corresponding terminals.

20. A method for transmitting optical signals to terminals comprising the steps of:

receiving first optical signals mutually provided in optical frequency division multiplexing with respect to each other, through an optical communication path;

demultiplexing said first optical signals mutually provided in optical frequency division multiplexing to second optical signals having a first common optical frequency; and distributing said second optical signals having the first common optical frequency to differing corresponding terminals.

21. A method for transmitting optical signals to an optical communication path comprising the steps of:

receiving first optical signals having a common optical frequency from terminals;

multiplexing said first optical signals having the common optical frequency mutually in a second optical signal in optical frequency division multiplexing fashion; and sending said second optical signal in optical frequency division multiplexing fashion to said optical communication path.

* * * * *